(12) United States Patent
Tochigi et al.

(10) Patent No.: US 8,339,714 B2
(45) Date of Patent: Dec. 25, 2012

(54) ZOOM LENS AND IMAGING APPARATUS INCORPORATING THE SAME

(75) Inventors: Akiyoshi Tochigi, Kokubunji (JP);
Kazuteru Kawamura, Hachioji (JP);
Yasuharu Yamada, Sagamihara (JP)

(73) Assignee: Olympus Imaging Corp., Toyko (JP)

( * ) Notice: Subject to any disclaimer, the term of this patent is extended or adjusted under 35 U.S.C. 154(b) by 0 days.

(21) Appl. No.: 13/248,570

(22) Filed: Sep. 29, 2011

(65) Prior Publication Data

US 2012/0092777 A1    Apr. 19, 2012

(30) Foreign Application Priority Data

Oct. 13, 2010   (JP) .................................. 2010-230639
Oct. 13, 2010   (JP) .................................. 2010-230640

(51) Int. Cl.
*G02B 15/14* (2006.01)
(52) U.S. Cl. ........ 359/684; 359/683; 359/685; 359/686; 359/714; 359/740; 359/766
(58) Field of Classification Search .................. 359/676, 359/683–686, 714, 740, 766
See application file for complete search history.

(56) References Cited

U.S. PATENT DOCUMENTS

| | | | | |
|---|---|---|---|---|
| 5,585,969 A * | 12/1996 | Endo | ............................ | 359/683 |
| 5,847,882 A | 12/1998 | Nakayama | | |
| 7,187,504 B2 * | 3/2007 | Horiuchi | ....................... | 359/683 |
| 7,372,635 B2 | 5/2008 | Morooka et al. | | |
| 7,428,107 B2 * | 9/2008 | Nishimura | ..................... | 359/683 |
| 7,453,650 B2 | 11/2008 | Hankawa et al. | | |
| 7,502,171 B2 | 3/2009 | Morooka et al. | | |
| 7,636,201 B2 | 12/2009 | Sudoh et al. | | |
| 2006/0197852 A1 | 9/2006 | Hankawa et al. | | |
| 2006/0279853 A1 | 12/2006 | Morooka et al. | | |
| 2008/0180808 A1 | 7/2008 | Hankawa et al. | | |
| 2008/0198474 A1 | 8/2008 | Morooka et al. | | |
| 2008/0304167 A1 * | 12/2008 | Souma | .......................... | 359/766 |
| 2009/0004036 A1 | 1/2009 | Achtelik et al. | | |
| 2009/0135500 A1 | 5/2009 | Sudoh et al. | | |

FOREIGN PATENT DOCUMENTS

| | | |
|---|---|---|
| JP | 08-005913 | 1/1996 |
| JP | 2002-228931 | 8/2002 |
| JP | 2006-276808 | 10/2006 |
| JP | 2007-003598 | 1/2007 |
| JP | 2009-128620 | 6/2009 |
| JP | 2010-032702 | 2/2010 |
| WO | WO 2010/013435 | 2/2010 |

\* cited by examiner

*Primary Examiner* — Evelyn A. Lester
(74) *Attorney, Agent, or Firm* — Kenyon & Kenyon LLP

(57) ABSTRACT

A zoom lens comprising, in order from an object side thereof, a first lens group of positive refracting power, a second lens group of negative refracting power, an aperture stop, a third lens group of positive refracting power, a fourth lens group of negative refracting power, and a fifth lens group of positive refracting power. Upon zooming from the wide-angle end to the telephoto end, at least the first lens group and the aperture stop remain fixed in position, the second and third lens groups move in the optical axis direction, and the separation between each of the lens groups and the aperture stop changes. Upon focusing from a focusing-on-infinity state to a close-range-focusing state, the fourth lens group moves in the optical axis direction, with satisfaction of the following:

$$-0.36 < f4/f1 < -0.05 \qquad (1A),$$

where f1 and f4 are the focal lengths of the first and fourth lens groups, respectively.

32 Claims, 26 Drawing Sheets

Example1

Example 2

Example3

Example 7

FIG.10
Example1
(0.3m)
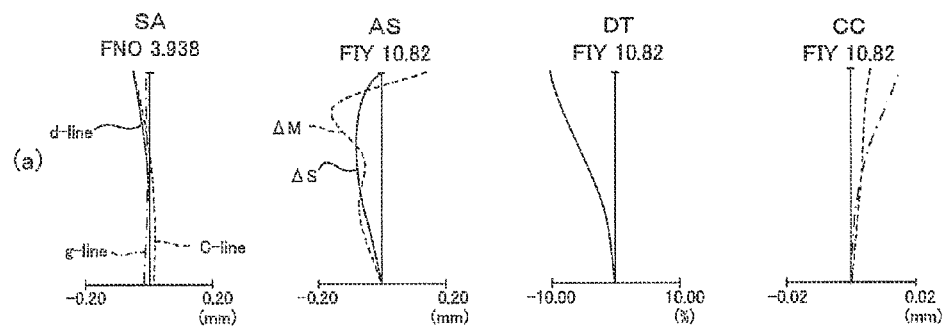
(a)
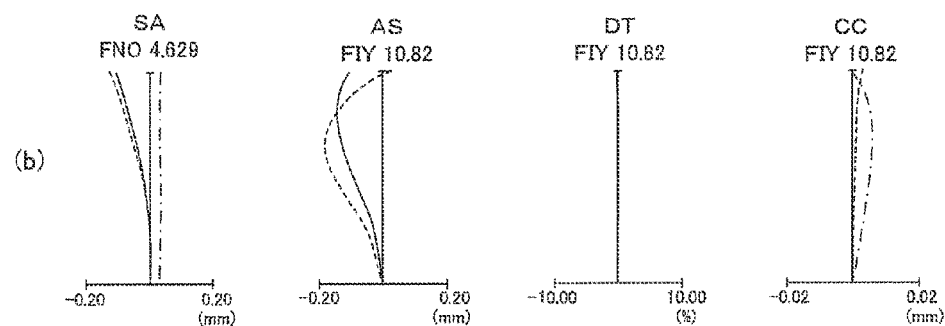
(b)
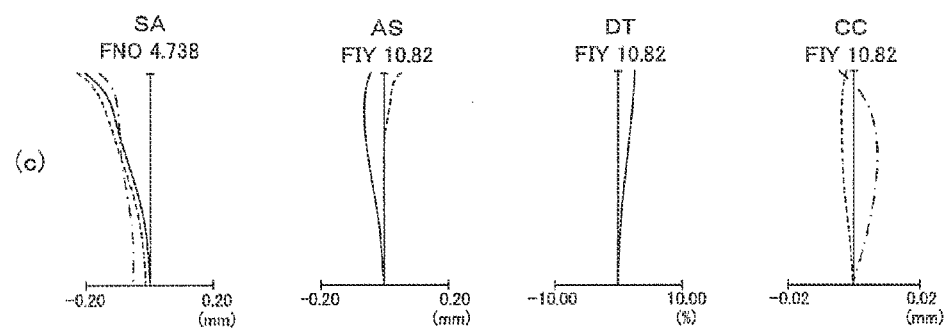
(c)

FIG.12
Example
(0.3m)
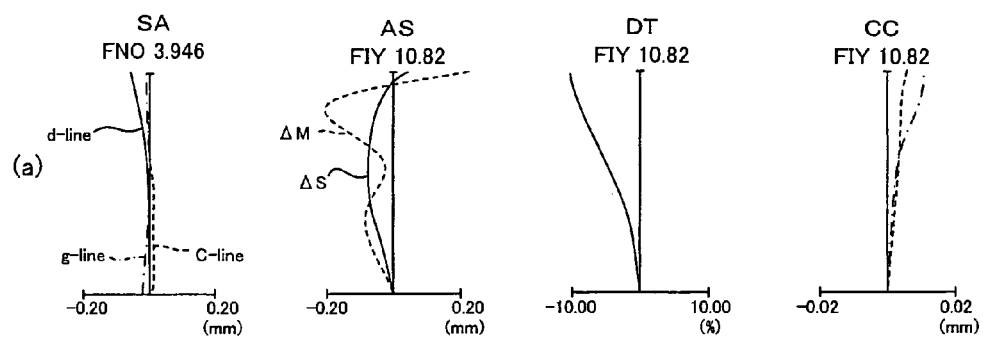
(a)
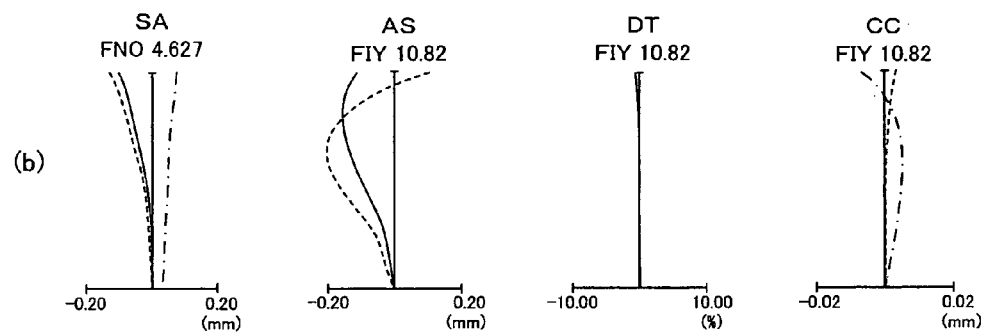
(b)
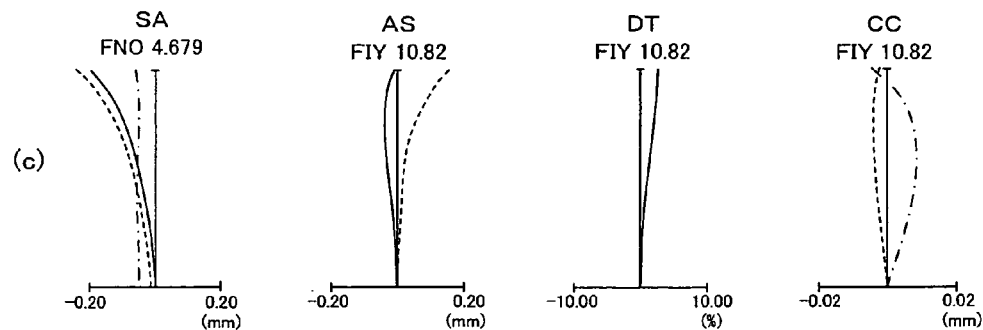
(c)

FIG.16
Example4
(0.4m)
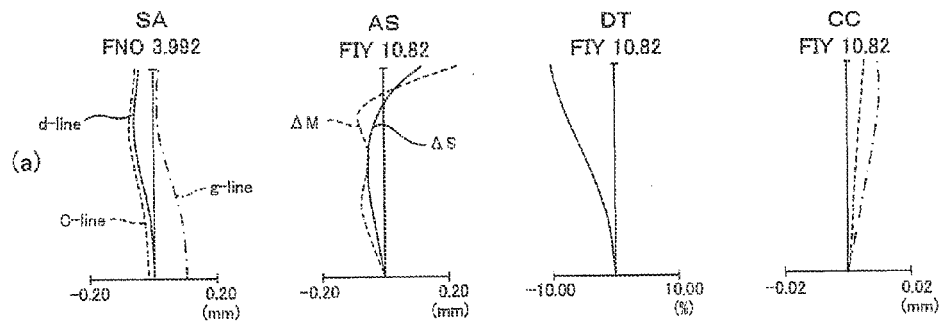
(a)
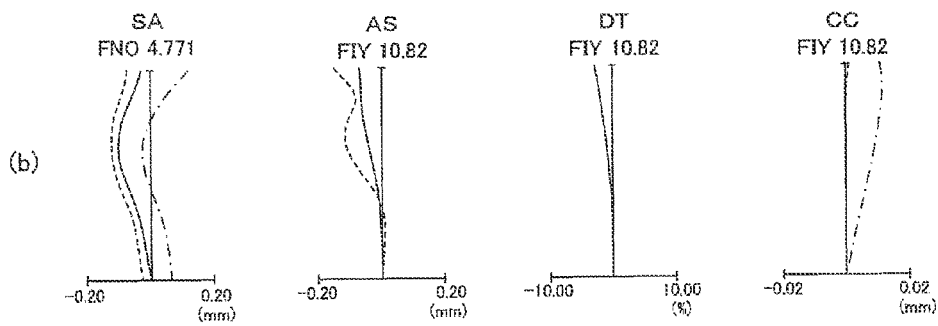
(b)
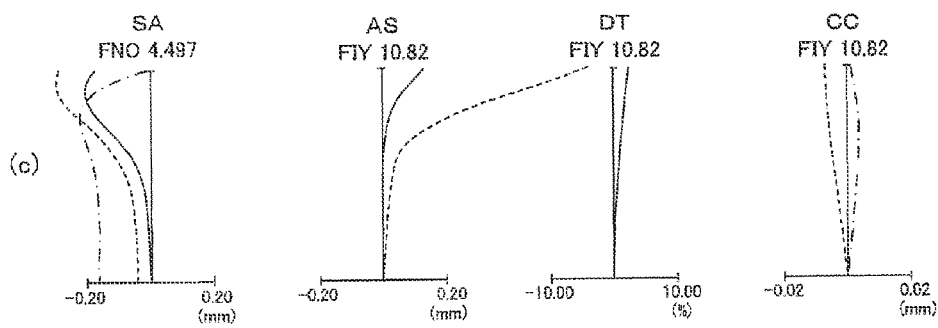
(c)

FIG.17
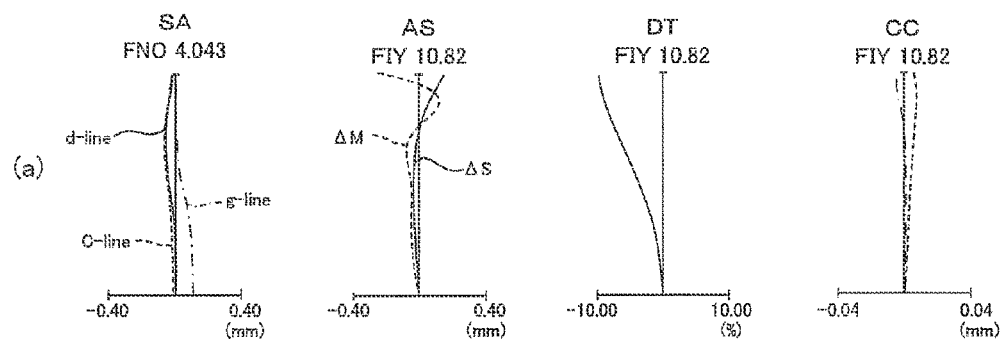
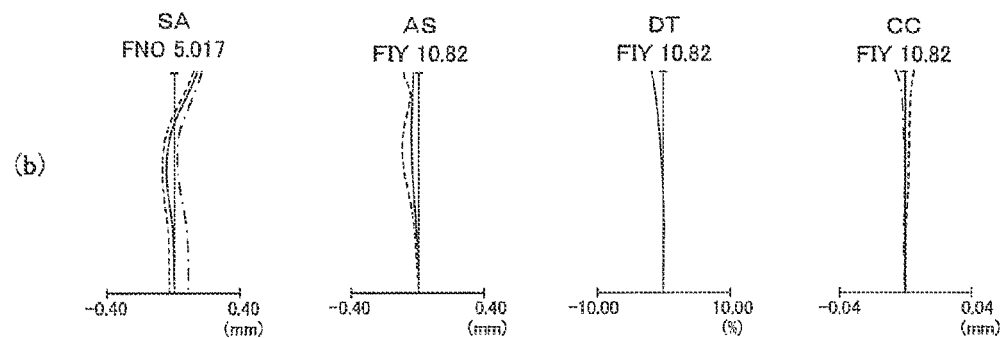
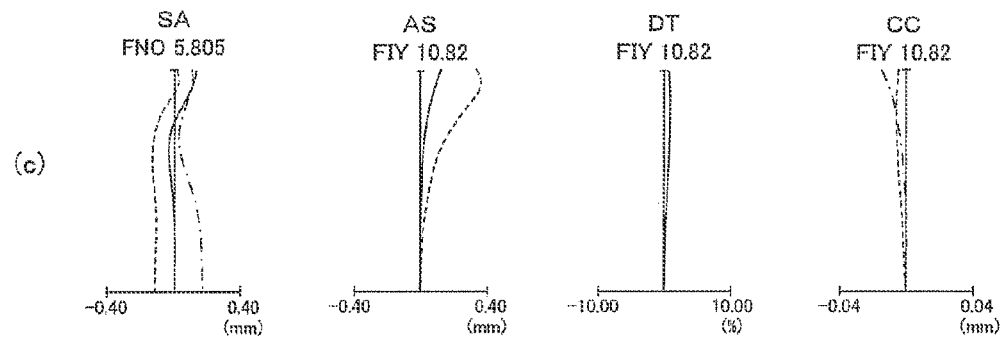

FIG.19
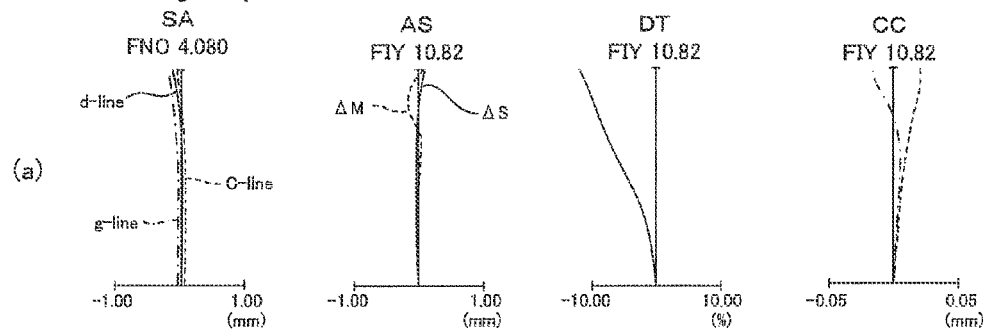
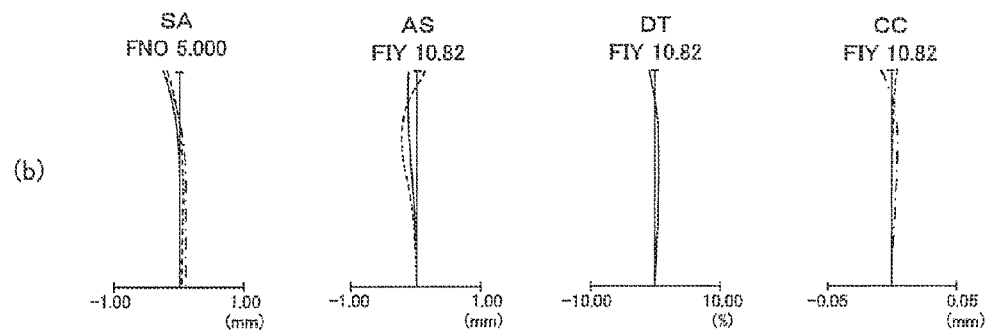
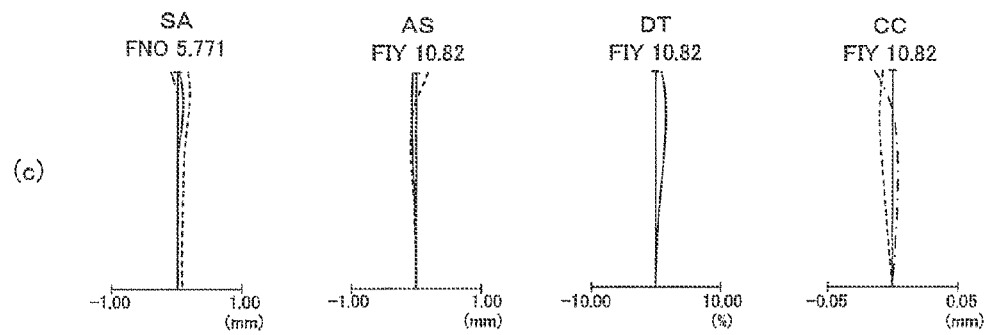

FIG.20
Example6
(0.5m)
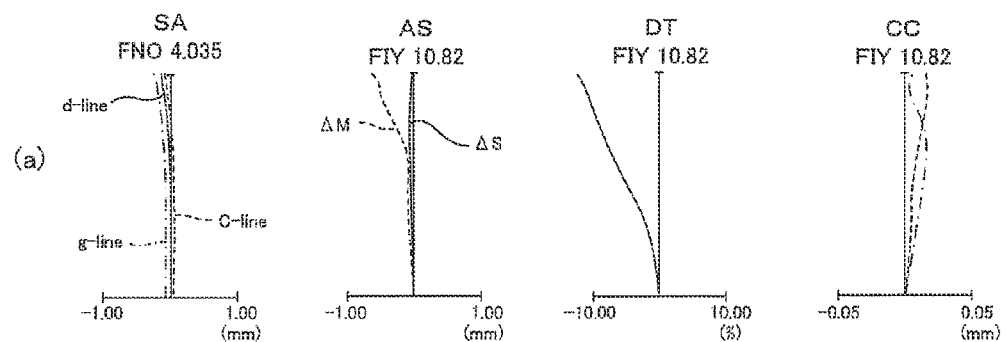
(a)
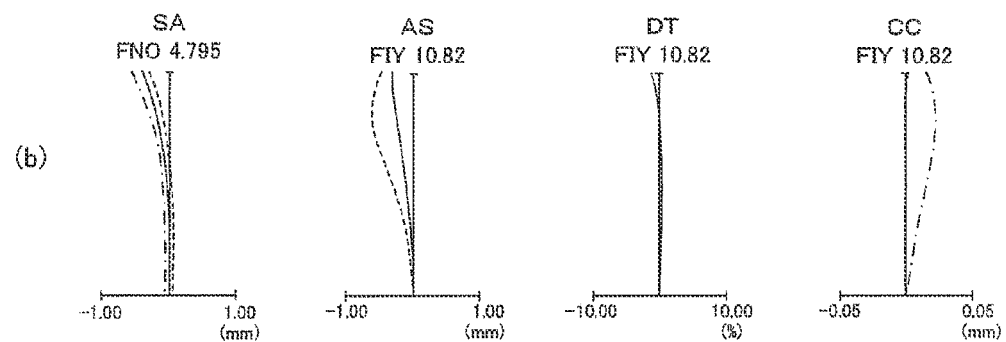
(b)
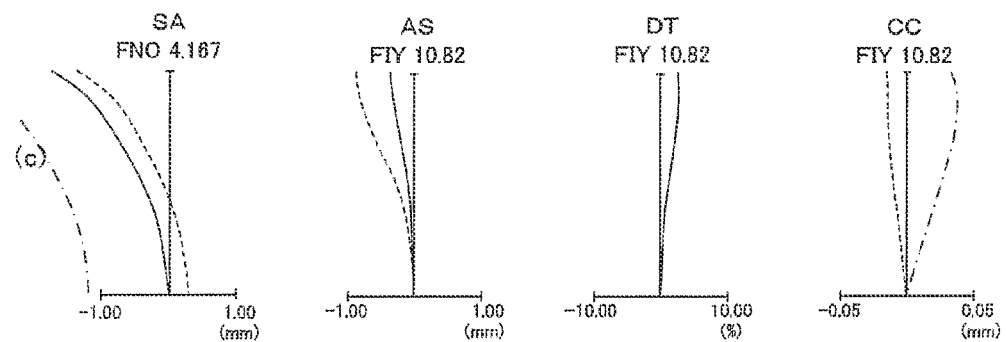
(c)

ZOOM LENS AND IMAGING APPARATUS INCORPORATING THE SAME

This application claims benefit of Japanese Application No. 2010-230639 filed in Japan on Oct. 13, 2010 and No. 2010-230640 filed in Japan on Oct. 13, 2010, the contents of which are incorporated by this reference.

BACKGROUND OF THE INVENTION

The present invention relates to a zoom lens that has its full length remaining constant during zooming, and focusing. Specifically, the invention relates to a small-format, wide-angle, high-zooming zoom lens that is well fit for an interchangeable lens system and capable of taking moving images. More specifically, the invention relates to an imaging apparatus equipped with a zoom lens having its full length remaining constant during zooming, and focusing.

So far, some digital camera products have been known to be capable of taking moving images. In recent years, interchangeable type digital cameras, inter alia, an interchangeable lens compatible with the function of the camera body of taking moving images have also been under study.

Only the requirement for conventional cameras designed to take still images has been that they are in focus on target subjects in the moment of image shooting after determination of the composition, because their object has been not to miss blink-of-an-eye shutter chances. For instance, the so-called phase contrast type autofocus (AF) function has been adopted because of its combined high speed/accuracy.

In the taking of moving images with some video cameras designed for professional use, on the other hand, a skilled cameraman has implemented focusing operation in the manual focus (MF) mode. For many consumer-oriented video cameras, however, it is required to put the AF system constantly in operation thereby keeping an in-focus state depending on object distances. To this end, the contrast AF mode (the so-called climbing mode) relying upon an imaging device has been adopted.

Further, to keep the in-focus state, the focus lens is constantly subjected to back-and-fore, fine movement (called wobbling) in the optical axis direction to measure contrast changes. As the in-focus state is judged as being changing, it causes the focus lens to be properly moved for re-focusing operation. This wobbling function requires very fast operation depending on frame rates; so there is still mounting demand for reducing the weight of a lens used for wobbling.

The range of movement of the constantly moving focus lens is kept within the depth of focus. In other words, it is controlled such that any out-of-focus state during wobbling cannot be recognized; however, when there is a large image magnification change (changes in the size of a subject on the imaging plane), images look quite unnatural because they look as if they were always waving. Accordingly, it is still a vital requirement to reduce or minimize the magnification changes during wobbling.

Some products capable of taking moving images have also been known to have a sound recording feature. As there are large noises produced out of the interchangeable lens per se upon zooming operation, it stands in the way to sound recording. For a zoom lens compatible with the function of taking moving images, therefore, it is now required to decrease the groups that keep moving during zooming operation (lens groups and aperture stops) in number so as to place noises stemming from zooming operation down to a sufficiently low level.

For an interchangeable lens used for both the taking of still images and the taking of moving images, it is required to have a wider-angle, higher-zooming feature in association with extended use of digital cameras.

Further, in a recently developed lens-interchangeable digital camera, its camera body is getting smaller and smaller in association with mirrorless design.

With camera body's size reduction and extended use of digital cameras, there is mounting demand for interchangeable lenses to get smaller and have a wider-angle feature and a higher zoom ratio.

So far, a positive-negative-positive-negative-positive five-groups type zoom lens has been known as the zoom lens of the type well fit for a wider-angle, higher-zooming feature.

Patent Publications 1 to 6 have come up with design examples of the positive-negative-positive-negative-positive five-groups type zoom lens suitable for such a wider-angle, higher-zooming feature.

Patent Publication 1 shows that upon zooming from the wide-angle end to the telephoto end, the first to fifth lens groups are designed to move. Patent Publications 2 to 6 show that upon zooming from the wide-angle end to the telephoto end, the first and fifth lens groups are designed to remain fixed. Patent Publications 2, 3, 4 and 6 show that the aperture stop is designed to remain fixed too. Patent Publications 2, 3, 5 and 6 show an arrangement suitable for size reduction wherein focusing is implemented as by the movement of the fourth lens group or the like.

LISTING OF THE PATENT PUBLICATIONS

[Patent Publication 1] JP(A) 2010-32702
[Patent Publication 2] JP(A) 8-5913
[Patent Publication 3] JP(A) 2002-228931
[Patent Publication 4] JP(A) 2006-276808
[Patent Publication 5] JP(A) 2007-3598
[Patent Publication 6] JP(A) 2009-128620

SUMMARY OF THE INVENTION

According to the first aspect of the invention, there is a zoom lens provided, which is located on an imaging plane side of an imaging device and comprises, in order from an object side toward an image side thereof, a first lens group of positive refracting power, a second lens group of negative refracting power, an aperture stop, a third lens group of positive refracting power, a fourth lens group of negative refracting power and a fifth lens group of positive refracting power, characterized in that, upon zooming from a wide-angle end to a telephoto end of the zoom lens, at least the first lens group and the aperture stop remain fixed in position, the second lens group and the third lens group move in an optical axis direction, and a separation between each of lens groups and the aperture stop changes; and upon focusing from a focusing-on-infinity state to a close-range-focusing state, the fourth lens group moves in the optical axis direction with satisfaction of the following Condition (1A)

$$-0.36 < f4/f1 < -0.05 \tag{1A}$$

where f1 is the focal length of the first lens group, and
f4 is the focal length of the fourth lens group.

The requirements for, and the advantages of, the thus constructed zoom lens are now explained.

The adoption of the positive-power leadoff type zoom lens wherein the lens group of positive refracting power is located on the most object side works for making sure high zoom ratios, and provides a lens layout preferable for a wide-angle, high-zooming zoom lens. A separation change between the first and the second lens group and a separation change between the second and the third lens group take a substantial part in zooming so that image position adjustment or the like is implemented by a separation change between the subsequent lens groups. In addition, the provision of the fourth lens group of negative refracting power and the fifth lens group of positive refracting power enables the exit pupil to be properly positioned to make the size of the first or the fourth lens group small. It is thus possible to set up a small-format, less costly zoom lens.

For the zoom lens according to the first aspect of the invention, it is required to operate in a zooming mode suitable for noise reduction during zooming and there is the need for decreasing the groups that keep moving during zooming in number, and weight reduction. In the first aspect of the invention, therefore, while the first lens group and the aperture stop remain fixed, the second and the third lens group move with a change in the separation sandwiched between each lens group and the aperture stop, thereby making sure high zoom ratios and adjusting image positions or the like.

The fourth lens group of negative refracting power works in favor of achieving weight reduction and making sure focusing sensitivity (making focusing possible in a reduced amount of movement). In addition, upon letting the fourth lens group out, the height of incidence of a chief ray on the fourth lens group and off the optical axis becomes low and the angle with the optical axis of the chief ray toward the fifth lens group becomes small, but the distance from the fourth to the fifth lens group grows so long that a change in the height of incidence of the chief ray on the imaging plane and off the optical axis is minimized to minimize magnification changes. By designing the fourth lens group as a focusing lens group, it is easy to hold back magnification changes in association with movement, resulting in the ability to hold back magnification changes during focusing (plus wobbling) operation.

Condition (1A) relates to the preferable refracting power of the first lens group, and the fourth lens group.

As the lower limit value of Condition (1A) is set at not less than −0.36 so as to make sure the refracting power of the fourth lens group, it enables the amount of movement of the fourth lens group to diminish upon focusing (plus wobbling). It also enables the moving space to diminish, working in favor of size reduction of the whole zoom lens. As the lower limit value of Condition (1A) is set at not less than −0.36 so as to keep the refracting power of the first lens group small, it enables aberrations occurring at the first lens group to be minimized, resulting in a low lenses count.

As the upper limit value of Condition (1A) is set at not greater than −0.05 so as to keep the refracting power of the fourth lens group small, it enables aberration fluctuations in association with focusing to be held back while keeping the lenses count of the fourth lens group low. It also helps make sure the refracting power of the first lens group, and enables the full length of the zoom lens to be curtailed, working for size reduction.

Thus, the present invention provides a zoom lens that makes it easy to view moving images upon focusing or wobbling during the taking of them. The invention also provides a zoom lens well fit for noise reduction upon zooming during the taking of moving images. Further, the invention provides a small-format, wide-angle, high-zooming interchangeable lens finding use for both the taking of still images and the taking of moving images. Still further, the invention provides an imaging apparatus equipped with such zoom lenses.

For the zoom lens according to the first aspect here, it is more preferable to satisfy at least one of the following requirements, or two or more of them at the same time.

Preferably, upon zooming from the wide-angle end to the telephoto end, at least the first lens group, the aperture stop and the fifth lens group remain fixed in position, and the second lens group, the third lens group and the fourth lens group move in the optical axis direction.

As the first and fifth lens groups are designed as fixed lens groups, it facilitates reducing noise in association with the movement of the second, the third and the fourth lens group. As the fourth lens group is designed to move both upon focusing and upon zooming, it works favorably for a low drive lens groups count.

It is preferable to satisfy the following Conditions (2A) and (3A) at the wide-angle end and in the focusing-on-infinity state:

$$|y1'-y1|/\Delta s<0.35 \qquad (2A)$$

$$|y0.7'-y0.7|/\Delta s<0.35 \qquad (3A)$$

where y1 is the maximum image height on an imaging plane,
y0.7 is seven-tenth of the maximum image height y1,
y1' is a ray height at a position where, when there is a defocus quantity of $\Delta s$ from a time of focusing on infinity as the fourth lens group is moved to an object at infinity, a chief ray having the same angle of view as an image-taking angle of view reaching the image height y1 upon focusing on infinity intersects the imaging plane,
y0.7' is a ray height at a position where, when there is a defocus quantity of $\Delta s$ from a time of focusing on infinity as the fourth lens group is moved to an object at infinity, a chief ray having the same angle of view as an image-taking angle of view reaching the image height y0.7 upon focusing on infinity intersects the imaging plane, and
$\Delta s$ is 8*the maximum image height y1/1000, provided that y1, y0.7, y1', y0.7' and $\Delta s$ are all given in mm.

For the zoom lens according to the first aspect here, there is the need for achieving any focusing mode that takes care of the fast driving (plus wobbling in the taking of moving images) of the focusing lens group; so there is mounting demand for weight reduction of the focusing group. For this reason, the first aspect of the invention is designed in such a way as to implement focusing (plus wobbling) at the fourth lens group.

The zoom lens here, because of having such an arrangement, enables image magnification changes to be much more reduced as compared with a conventional zoom lens upon focusing (plus wobbling during the taking of moving images). The amount of image magnification changes differs with image heights; that amount cannot fully be reduced only with specific image heights, so it must be reduced throughout the screen.

Conditions (2A) and (3A) are provided for that purpose: they are the ones for determining the amount of image magnification changes relative to the defocus quantity. It is here noted that although differing with the value of defocus quantity $\Delta s$, calculation is made in terms of a defocus quantity equivalent to an allowed depth. Generally, the allowed depth may be represented by F-number*allowed diameter of circle of confusion. In the first aspect of the invention, however, the F-number is supposed to be equal to 8, and the allowed diameter of circle of confusion is supposed to be equal to the maximum image height (y1)/1000.

In order to reduce the amount of image magnification changes all over the screen, there is the need for satisfying both, not just one of, Conditions (2A) and (3A), as contemplated herein. It has now been found that by satisfying both conditions (2A) and (3A), image magnification changes can be kept small even in other image height states and focal length states. Exceeding the upper limit values of Conditions (2A) and (3A) is not preferable because the amount of image magnification changes grows large.

FIG. 1 is illustrative in schematic of the definitions of the conditions for the zoom lens according to the first aspect of the invention. For convenience of illustration, the shape and number of lenses in each of the first to fifth lens groups are simplified, while the amount of movement of and the optical path through the fourth lens group supposed to wobble are exaggerated.

The zoom lens according to the first aspect of the invention can be built up of, in order from its object side to its image side (imaging plane), a first lens group of positive refracting power, a second lens group of negative refracting power, a third lens group of positive refracting power, a fourth lens group of negative refracting power and a fifth lens group of positive refracting power.

In FIG. 1, a light ray A is indicative of a chief ray incident on the position of the maximum image height (y1) at the imaging plane upon focusing on infinity, and a light ray B is indicative of a chief ray incident on the position (y0.7) seven-tenth of the maximum image height (y1) at the imaging plane upon focusing on infinity.

The zoom lens according to the first aspect is characterized in that the fourth lens group is moved for focusing or wobbling. In FIG. 1, a light ray A' is indicative of a displacement of the chief ray A as the fourth lens group is moved for focusing or wobbling to form an image at a position separate away from the imaging plane by the defocus quantity Δs.

In FIG. 1, a light ray B' is indicative of a displacement of the chief ray B as the fourth lens group is moved for focusing or wobbling to form an image at a position separate away from the imaging plane by the defocus quantity Δs. It is here noted that the defocus quantity Δs is supposed to be 8*the maximum image height (y1)/1000, as already described.

An image height where the ray A' is imaged at the imaging plane is defined by y1', and an image height where the ray B' is imaged at the imaging plane is defined by y0.7'.

The fourth lens group of negative refracting power works in favor of making sure weight reductions and focusing sensitivity. In addition, although the separation between the fourth lens group and the fifth lens group grows wide as the fourth lens group is let out, the height of incidence of the chief ray on the fourth lens group and off the optical axis becomes so low that magnification changes at the imaging plane are canceled out. This facilitates holding back magnification changes in association with the movement of the fourth lens group, and magnification changes upon focusing (plus wobbling) operation. This favors the taking of moving images in particular. When focusing from a far distance to a near distance is implemented by moving the fourth lens group toward the image side, too, magnification changes on the imaging plane are held back.

For the maximum image height y1 at the imaging plane, it is preferable to satisfy the following Condition (AA):

$$8.0 < y1 < 25.0 \tag{AA}$$

As the lower limit value of Condition (AA) is set at not less than 8.0 so as to make sure the imaging area, it facilitates prevention of signal noises upon high-sensitivity image shooting. In addition, this leads to an increase in the amount of movement for focusing (plus wobbling), facilitating control. As the upper limit value of Condition (AA) is set at not greater than 25.0 so as to prevent the imaging area from increasing, it facilitates prevention of the zoom lens from getting bulkier. In addition, this also helps reduce the size of the lens for focusing (plus wobbling) operation, resulting in power savings.

Thus, the fourth lens group may be designed not only for focusing but also for wobbling in the optical axis direction prior to focusing.

If the fourth lens group operates not only for focusing but also for wobbling in the optical axis direction prior to focusing, then it allows the focusing state to be maintained, working especially in favor of the taking of moving images.

For the fourth lens group, it is preferable to comprise one positive lens and one negative lens, and include two lenses at most.

This enables aberrations occurring at the positive lens and the negative lens to be mutually canceled out while reducing the weight of the fourth lens group, working for decreased various aberrations at the fourth lens group.

It is preferable to satisfy the following Condition (4A):

$$0.20 < \Sigma 1G/\Sigma 2G < 1.00 \tag{4A}$$

where Σ1G is the on-axis thickness of the first lens group, and Σ2G is the on-axis thickness of the second lens group.

Condition (4A) relates to the preferable on-axis thickness of the first lens group, and the second lens group. As the lower limit value of Condition (4A) is set at not less than 0.20 so as to properly determine the on-axis thickness of the first lens group, it works for correction of aberrations at the first lens group. As the upper limit value of Condition (4A) is set at not greater than 1.00 so as to properly determine the on-axis thickness of the first lens group, it prevents the first lens group from getting bulkier.

It is preferable to satisfy the following Condition (5A):

$$0.03 < \Sigma 1G/f1 < 0.23 \tag{5A}$$

where Σ1G is the on-axis thickness of the first lens group, and f1 is the focal length of the first lens group.

Condition (5A) relates to the preferable on-axis thickness and refracting power of the first lens group.

As the lower limit value of Condition (5A) is set at not less than 0.03 so as to make sure the refracting power of the first lens group, it enables the full length of the zoom lens to be curtailed, working for size reduction.

As the upper limit value of Condition (5A) is set at not greater than 0.23 so as to properly determine the on-axis thickness of the first lens group, it keeps the first lens group from growing bulkier. It also keeps the refracting power of the first lens group so small that aberrations occurring at the first lens group are held back, resulting in a low lenses count.

It is preferable to satisfy the following Condition (6A)

$$\Sigma 1G5G/y1 < 15.9 \tag{6A}$$

where Σ1G5G is the on-axis thickness of the optical system from the objet-side surface in the first lens group to the image-side surface in the fifth lens group at the wide-angle end, and y1 is the maximum image height on the imaging plane.

Condition (6A) relates to the on-axis thickness of the optical system from the first lens group to the fifth lens group. As the upper limit value of Condition (6A) is set at not greater than 15.9 so as to properly determine the on-axis thickness of the optical system from the first lens group to the fifth lens group, it prevents the zoom lens from growing bulkier.

It is preferable to satisfy the following Condition (7A):

$$0.50 < d2G/fw < 5.00 \tag{7A}$$

where d2G is the amount of movement of the second lens group upon zooming from the wide-angle end to the telephoto end, provided that its movement toward the image side is taken as having a positive sign, and fw is the focal length of the whole zoom lens system at the wide-angle end.

Condition (7A) relates to the preferable amount of movement of the second lens group upon zooming from the wide-angle end to the telephoto end.

As the lower limit value of Condition (7A) is set at not less than 0.50 so as to properly determine the amount of movement of the second lens group upon zooming, it allows for a proper sharing of the zoom ratio by the movement of the second lens group and the zoom ratio by the movement of the third lens group, preventing an increase in the amount of movement of the third lens group and, hence, working for a curtailing of the full length of the zoom lens.

As the upper limit value of Condition (7A) is set at not greater than 5.00 so as to properly determine the amount of movement of the second lens group upon zooming, it prevents an increase in the amount of movement of the second lens group and, hence, working for a curtailing of the full length of the zoom lens.

Preferably, the second lens group is made up of four lenses: in order from the object side to the image side, the first negative lens, the second negative lens, the first positive lens and the second positive lens or, alternatively, the first negative lens, the second negative lens, the first positive lens and the third negative lens.

As the second lens group is made up of four such lenses, it works for a decrease in the aberrations produced at the second lens group, and enables the principal points to draw nearer to the first lens group, working for making sure high zoom ratios, etc.

Preferably, the third lens group is made up of four lenses: in order from the object side to the image side, the first positive lens, the second positive lens, the first negative lens and the third positive lens or, alternatively, five lenses: the first positive lens, the second positive lens, the first negative lens, the second negative lens and the third positive lens, and at least two lenses in the third lens group are cemented together.

As the third lens group is made up of four or five such lenses, it enables the principal points to be let out more on the object side, and makes the lenses' refracting power profile of the third lens group symmetric, working for a decrease in the aberrations produced at the third lens group.

The incorporation of the cemented lens works for a decrease in chromatic aberrations.

Preferably, the fifth lens group is made up of one positive lens or two lenses: one positive lens and one negative lens.

The one-lens construction of the fifth lens group works for size reduction of the fifth lens group or, alternatively, the two-lenses construction of the fifth lens group works for a decrease in various aberrations produced there, because they are mutually canceled out at the positive and negative lenses.

Preferably at the telephoto end with respect to the wide-angle end, the second lens group is positioned on the image side, the third lens group is positioned on the object side, the fourth lens group is positioned on the object side, the separation between the third and the fourth lens group grows wide, and the separation between the fourth and the fifth lens group grows wide.

The second, and the third lens group may take hold of the zooming function and the fourth lens group may be capable of adjustment of the image plane position. However, the aforesaid moving mode makes surer the range of movement of the fourth lens group for focusing at the telephoto end, working for near-distance focusing.

It is preferable to satisfy the following Conditions (8A) and (9A):

$$4.6 < ft/fw < 12.5 \tag{8A}$$

$$35° < \omega w < 50° \tag{9A}$$

where fw is the focal length of the whole zoom lens system upon focusing on infinity at the wide-angle end, ft is the focal length of the whole zoom lens system upon focusing on infinity at the telephoto end, and ωw is the maximum half angle of view upon focusing on infinity at the wide-angle end.

Conditions (8A) and (9A) define the preferable specifications in the case where the zoom lens of the first aspect is used.

Condition (8A) defines the preferable zoom ratio. As the lower limit value of Condition (8A) is preferably set at not less than 4.6 so as to make sure high zoom ratios, it permits the zoom lens to address a variety of photographic scenes. As the upper limit value is set at not greater than 12.5, it works in favor of decreased aberration fluctuations and making sure brightness at the telephoto end.

Condition (9A) defines the preferable half angle of view at the wide-angle end. To make sure the angle of view, it is preferable to set the lower limit value of Condition (9A) at not less than 35°. As the upper limit value is set at not greater than 50°, it helps keep the angle of view properly small, working for decreased off-axis aberrations.

For the imaging apparatus according to the first aspect of the invention, it is preferable to comprise a zoom lens recited in any one of the zoom lens embodiments as described above and an imaging device having an imaging plane for converting or transforming an optical image into electric signals.

Unless otherwise defined, the arrangements as described above are each supposed to be set for focusing on infinity. More preferably, two or more of the requirements or limitations as described above should be satisfied at the same time.

More preferably, the upper or lower limit value of each condition should be narrowed down as follows. The application of such an upper or lower limit value could result in further improvements.

Of Condition (1A), it is more preferable to set the lower limit value at −0.33 and the upper limit value at −0.10.

Of Conditions (2A) and (3A), it is more preferable to set the lower limit values of one or both of Conditions (2A) and (3A) at 0.29 in the focusing-on-infinity state at the wide-angle end, because satisfactory moving images can be viewed on a large-screen TV or the like even under stricter viewing conditions.

Of Condition (4A), it is more preferable to set the lower limit value at 0.31 and the upper limit value at 0.87.

Of Condition (5A), it is more preferable to set the lower limit value at 0.05 and the upper limit value at 0.21.

Of Condition (6A), it is more preferable to set the upper limit value at 14.1.

Of Condition (7A), it is more preferable to set the lower limit value at 0.97 and the upper limit value at 4.10.

Of Condition (AA), it is more preferable to set the lower limit value at 9.5 and the upper limit value at 18.0.

Another aspect of the present invention provides a zoom lens that is located on the imaging plane side of an imaging device, and comprises, in order from an object side thereof, a first lens group of positive refracting power, a second lens group of negative refracting power, an aperture stop, a third lens group of positive refracting power, a fourth lens group of negative refracting power and a fifth lens group of positive refracting power, characterized in that upon zooming from a wide-angle end to a telephoto end thereof, at least the first lens group and the aperture stop remain fixed in position, the second lens group and the third lens group move in such a way as to draw nearer to the aperture stop at the telephoto end than at the wide-angle end, and a separation sandwiched between each of the lens groups and the aperture stop changes, and upon focusing from a focusing-on-infinity state to a close-range-focusing state, the fourth lens group moves in an optical axis direction, with satisfaction of the following Conditions (1B) and (2B):

$$4.0 < ft/fw \quad (1B)$$

$$\Sigma 1G5G/yw < 15.9 \quad (2B)$$

where fw is the focal length of the whole zoom lens system upon focusing on infinity at the wide-angle end, ft is the focal length of the whole zoom lens system upon focusing on infinity at the telephoto end, $\Sigma 1G5G$ is the on-axis thickness of the optical system from the object-side surface in the first lens group to the image-side surface in the fifth lens group at the wide-angle end, and yw is the maximum image height on the imaging plane at the wide-angle end.

The requirements for, and the advantages of, the thus constructed zoom lens are now explained.

The adoption of the positive-power leadoff type zoom lens wherein the lens group of positive refracting power is located on the most object side works in favor of making sure high zoom ratios, and provides a lens layout preferable for a wide-angle, high-zooming zoom lens. A separation change between the first and the second lens group and a separation change between the second and the third lens group take a substantial part in zooming so that image position adjustment or the like is implemented by a separation change between the subsequent lens groups. In addition, the provision of the fourth lens group of negative refracting power and the fifth lens group of positive refracting power enables the exit pupil to be properly positioned to make the size of the first or the fourth lens group small. It is thus possible to set up a small-format, less costly zoom lens.

For the zoom lens, it is necessary to achieve a zooming mode suitable for keeping it quiet during zooming, and there is the need for decreasing the number and weight of the groups that keep moving during zooming. In the zoom lens according to the second aspect of the invention, therefore, the first lens group and the aperture stop remain fixed, the second lens group and the third lens group move, and the separation between each of the lens groups and the aperture stop is changed for making sure high zoom ratios and image position adjustment or the like.

The fourth lens group of negative refracting power works in favor of achieving weight reduction and making sure focusing sensitivity (making focusing possible in a reduced amount of movement). In addition, upon letting the fourth lens group out, the height of incidence of a chief ray on the fourth lens group and off the optical axis becomes low and the angle with the optical axis of the chief ray toward the fifth lens group becomes small, but the distance from the fourth to the fifth lens group grows so long that a change in the height of incidence of the chief ray on the imaging plane and off the optical axis is minimized to minimize magnification changes. When focusing from a far distance to a near distance is implemented by the movement of the fourth lens group toward the image side, too, the magnification changes on the imaging plane is held back or minimized. By designing the fourth lens group as the focusing group, therefore, it is easy to hold back magnification changes in association with movement, resulting in the ability to hold back magnification changes during focusing (plus wobbling) operation.

Condition (1B) defines the preferable zoom ratio. As the lower limit value of Condition (1B) is preferably set at not less than 4.0, it permits the zoom lens to address a variety of photographic scenes.

Condition (2B) relates to the preferable on-axis thickness of the first to the fifth lens group. As the upper limit value of Condition (2B) is set at not greater than 15.9 to properly determine the on-axis thickness of the first to the fifth lens group, it helps prevent the zoom lens from getting bulkier.

It is thus possible to provide a zoom lens that facilitates noise reduction and prevention of entrance of dusts and offers a sensible tradeoff between size reduction and high zoom ratios. In addition, it is possible to provide an imaging apparatus equipped with such a zoom lens.

For the zoom lens according to the second aspect of the invention as described above, it is more preferable to satisfy at least one of the following requirements or limitations or, alternatively, two or more of them at the same time.

For the zoom lens, it is preferable that, upon zooming from the wide-angle end to the telephoto end, at least the first lens group, the aperture stop and the fifth lens group remain fixed in position, and the second lens group, the third lens group and the fourth lens group move in the optical axis direction.

As the first and fifth lens groups are designed as fixed lens groups, it facilitates reducing noise in association with the movement of the second, the third and the fourth lens group. As the fourth lens group is designed to move both upon focusing and upon zooming, it works for a low drive lens groups count.

For the zoom lens, it is preferable to satisfy the following Condition (3B):

$$-0.36 < f4/f1 < -0.05 \quad (3B)$$

where f1 is the focal length of the first lens group, and f4 is the focal length of the fourth lens group.

Condition (3B) relates to the preferable refracting power of the first lens group, and the fourth lens group. As the lower limit value of Condition (3B) is set at not less than −0.36 to make sure the refracting power of the fourth lens group, it enables the amount of movement of the fourth lens group to diminish upon focusing. It also enables the moving space to be kept small, working for size reduction of the whole zoom lens. As the lower limit value of Condition (3B) is set at not less than −0.36 to keep small the refracting power of the first lens group, it enables aberrations occurring at the first lens group to be held back, resulting in a low lenses count. As the upper limit value of Condition (1A) is set at not greater than −0.05 to keep small the refracting power of the fourth lens group, it enables aberration fluctuations in association with focusing to be held back while keeping the lenses count of the fourth lens group low. It also helps make sure the refracting power of the first lens group, and enables the full length of the zoom lens to be curtailed, working for size-reduction.

For the fourth lens group in the zoom lens, it is preferable to comprise one positive lens and one negative lens, and include two lenses at most.

This enables aberrations occurring at the positive lens and the negative lens to be mutually canceled out while reducing the weight of the fourth lens group, working for decreased various aberrations at the fourth lens group.

For the zoom lens, it is preferable to satisfy the following Condition (4B):

$$0.20 < \Sigma 1G/\Sigma 2G < 1.00 \quad (4B)$$

where $\Sigma 1G$ is the on-axis thickness of the first lens group, and
$\Sigma 2G$ is the on-axis thickness of the second lens group.

Condition (4B) relates to the preferable on-axis thickness of the first lens group, and the second lens group. As the lower limit value of Condition (4B) is set at not less than 0.20 so as to properly determine the on-axis thickness of the first lens group, it works for correction of aberrations. As the upper limit value of Condition (4B) is set at not greater than 1.00 so as to properly determine the on-axis thickness of the first lens group, it prevents the first lens group from growing bulkier.

For the zoom lens, it is preferable to satisfy the following Condition (5B):

$$0.03<\Sigma 1G/f1<0.23 \quad (5B)$$

where Σ1G is the on-axis thickness of the first lens group, and f1 is the focal length of the first lens group.

Condition (5B) relates to the preferable on-axis thickness and refracting power of the first lens group. As the lower limit value of Condition (5B) is set at not less than 0.03 so as to make sure the refracting power of the first lens group, it enables the full length of the zoom lens to be curtailed, working for size reduction. As the upper limit value of Condition (5B) is set at not greater than 0.23 so as to properly determine the on-axis thickness of the first lens group, it keeps the first lens group from growing bulkier. It also enables the refracting power of the first lens group to be kept so small that aberrations occurring at the first lens group are held back, resulting in a low lenses count.

For the zoom lens, it is preferable to satisfy the following Condition (6B):

$$0.50<d2G/fw<5.00 \quad (6B)$$

where d2G is the amount of movement of the second lens group upon zooming from the wide-angle end to the telephoto end, provided that its movement toward the image side is taken as having a positive sign, and fw is the focal length of the whole zoom lens system at the wide-angle end.

Condition (6B) relates to the preferable amount of movement of the second lens group upon zooming from the wide-angle end to the telephoto end. As the lower limit value of Condition (6B) is set at not less than 0.50 so as to properly determine the amount of movement of the second lens group upon zooming, it allows for a proper sharing of the zoom ratio by the movement of the second lens group and the zoom ratio by the movement of the third lens group, preventing an increase in the amount of movement of the third lens group and, hence, working for a curtailing of the full length of the zoom lens. As the upper limit value of Condition (6B) is set at not greater than 5.00 so as to properly determine the amount of movement of the second lens group upon zooming, it prevents an increase in the amount of movement of the second lens group, working for a curtailing of the full length of the zoom lens.

For the zoom lens, it is preferable that the first lens group comprises two lenses: one positive lens and one negative lens.

The incorporation of the negative lens in the first lens group allows for cancellation of various aberrations produced at the positive lens, and composing the first lens group of two lenses at most works for cost reduction as well.

For the zoom lens, it is preferable that the second lens group comprises four lenses: in order from the object side to the image side, the first negative lens, the second negative lens, the first positive lens and the second positive lens or, alternatively, the first negative lens, the second negative lens, the first positive lens and the third negative lens.

As the second lens group comprises four such lenses, it works for a decrease in the aberrations produced at the second lens group, and enables the principal points to draw nearer to the first lens group, working for making sure high zoom ratios, etc.

For the zoom lens, it is preferable that the third lens group comprises four lenses: in order from the object side to the image side, the first positive lens, the second positive lens, the first negative lens and the third positive lens or, alternatively, five lenses: the first positive lens, the second positive lens, the first negative lens, the second negative lens and the third positive lens, and at least two lenses in the third lens group are cemented together.

As the third lens group comprises four or five such lenses, it enables the principal points to be let out more on the object side, and makes the lenses' refracting power profile of the third lens group symmetric, working for a decrease in the aberrations produced at the third lens group. The incorporation of the cemented lens works for a decrease in chromatic aberrations.

For the zoom lens, it is preferable that the fifth lens group comprises one positive lens or, alternatively, two lenses: one positive lens and one negative lens.

The one-lens construction of the fifth lens group works for size reduction of the fifth lens group or, alternatively, the two-lenses construction of the fifth lens group works for a decrease in various aberrations produced there, because they are mutually canceled out at the positive and negative lenses.

For the zoom lens, it is preferable that, at the telephoto end with respect to the wide-angle end, the second lens group is positioned on the image side, the third lens group is positioned on the object side, the fourth lens group is positioned on the object side, the separation between the third and the fourth lens group grows wide, and the separation between the fourth and the fifth lens group grows wide.

The second and the third lens group may take hold of the zooming function, and the fourth lens group may make adjustment of the image plane position. However, the aforesaid moving mode makes surer the range of focusing movement of the fourth lens group at the telephoto end, working for near-distance focusing.

For the zoom lens, it is preferable to satisfy the following Conditions (7B) and (8B):

$$0.1<f3/f1<0.4 \quad (7B)$$

$$0.7<|f3/f2|<1.9 \quad (8B)$$

where f1 is the focal length of the first lens group,
f2 is the focal length of the second lens group, and
f3 is the focal length of the third lens group.

Conditions (7B) and (8B) define the focal length balance between the first, the second and the third lens group that is preferable for offering a sensible tradeoff between size reduction and high zoom ratios.

More specifically, Condition (7B) defines the preferable focal-length ratio between the first lens group and the third lens group. As the lower limit value of Condition (7B) is set at not less than 0.1 so as to make sure the refracting power of the first lens group, it enables the full length of the zoom lens to be curtailed, working for size reduction. As the upper limit value of Condition (7B) is set at not greater than 0.4 so as to make sure the refracting power of the third lens group, it works for making sure the third lens group has a zooming function. Or it enables the refracting power of the first lens group to be kept small, allowing the first lens group to have a low-profile feature.

Condition (8B) defines the preferable focal-length ratio between the second lens group and the third lens group. As the lower limit value of Condition (8B) is set at not less than 0.7 so as to make sure the refracting power of the second lens group, it works for making sure the zooming function of the second lens group, and size reduction due to a shallow position of the entrance pupil. Or it helps keep the refracting power of the third lens group small, leading to a decrease in the aberrations at the third lens group. As the upper limit value of Condition (8B) is set at not greater than 1.9 so as to make sure the refracting power of the third lens group, it works for making sure the zooming function of the third lens group. Or it helps keep the refracting power of the second lens group small, leading to a decrease in the aberrations at the second lens group.

If Conditions (7B) and (8B) are satisfied at the same time, then it makes sure the second and third lens groups have the shared zooming function, working for a diameter reduction of the first lens group.

For the zoom lens, it is preferable that the second, the third, and the fourth lens group moves with satisfaction of the following Conditions (9B), (10B) and (11B):

$$2.0 < \beta 3T/\beta 3W < 5.0 \qquad (9B)$$

$$1.1 < \beta 4T/\beta 4W < 2.0 \qquad (10B)$$

$$0.3 < (\beta 2T/\beta 2W)/\{(\beta 3T/\beta 3W) \cdot (\beta 4T/\beta 4W)\} < 0.75 \qquad (11B)$$

where $\beta 2T$ is the transverse magnification of the second lens group at the telephoto end, $\beta 2W$ is the transverse magnification of the second lens group at the wide-angle end, $\beta 3T$ is the transverse magnification of the third lens group at the telephoto end, $\beta 3W$ is the transverse magnification of the third lens group at the wide-angle end, $\beta 4T$ is the transverse magnification of the fourth lens group at the telephoto end, and $\beta 4W$ is the transverse magnification of the fourth lens group at the wide-angle end.

Condition (9B) defines the preferable zooming sharing of the third lens group; Condition (10B) defines the preferable zooming sharing of the fourth lens group; and Condition (11B) defines the preferable zooming sharing of the second lens group.

As the lower limit values of Conditions (9B) and (10B) are set at not less than 2.0 and 1.1, respectively, it works for making sure high zoom ratios. As the upper limit values of Conditions (9B) and (10B) are set at not greater than 5.0 and 2.0, respectively, it enables the amounts of movement of the third and fourth lens groups to get small, working for a curtailing of the full length of the optical system.

As the lower limit value of Condition (11B) is set at not less than 0.3, it makes sure the zooming function of the second lens group, working for keeping hold of high zoom ratios. As the upper limit value of Condition (11B) is set at not greater than 0.75, it helps ease the zooming sharing of the second lens group, facilitating keeping the amount of movement of the second lens group small and working for size reduction of the first lens group.

For the zoom lens, it is preferable to satisfy the following Condition (12B):

$$35° < \omega w < 50° \qquad (12B)$$

where ωw is the maximum half angle of view upon focusing on infinity at the wide-angle end.

Condition (12) defines the preferable half angle of view in the case of using the zoom lens. Setting the lower limit value of Condition (12B) at not less than 35° is preferable to make sure the angle of view. As the upper limit value of Condition (12B) is set at not greater than 50° so as to properly determine the angle of view, it works for decreasing off-axis aberrations.

For the imaging apparatus, it is preferable to comprise the zoom lens and an imaging device having an imaging plane for converting or transforming an optical image into electrical signals.

Unless otherwise defined, the arrangements as described above are each supposed to be set for focusing on infinity. More preferably, two or more of the requirements or limitations as described above should be satisfied at the same time.

More preferably, the upper or lower limit value of each condition should be reduced down as follows. The application of such an upper or lower limit value could result in further improvements.

Of Condition (1B), the lower limit value should be at more preferably 4.4, and even more preferably 4.7. More preferably, there should be an upper limit value of not greater than 21.0 provided for the purpose of diminishing aberration fluctuations in association with zooming and making sure brightness at the telephoto end. Even more preferably, the upper limit value should be set at not greater than 15.0, especially 12.5.

Of Condition (2B), the upper limit value is set at preferably 14.1. More preferably, there should be a lower limit value of not less than 8.0 provided or the purpose of helping make sure the refracting power necessary for each lens, which works for making sure high zoom ratios.

Of Condition (3B), the lower limit value should be set at more preferably −0.33, and the lower limit value should be set at more preferably −0.10.

Of Condition (4B), the lower limit value should be set at more preferably 0.31, and the upper limit value should be set at more preferably 0.87.

Of Condition (5B), the lower limit value should be set at more preferably 0.05, and the upper limit value should be set at more preferably 0.21.

Of Condition (6B), the lower limit value should be set at more preferably 0.97, and the upper limit value should be set at more preferably 4.10.

Of Condition (7B), the lower limit value should be set at more preferably 0.15, even more preferably 0.17, and the upper limit value should be set at more preferably 0.35, even more preferably 0.32.

Of Condition (8B), the lower limit value should be set at more preferably 0.9, even more preferably 0.17, and the upper limit value should be set at more preferably 1.6, even more preferably 1.3.

Of Condition (9B), the lower limit value should be set at more preferably 2.15, and the upper limit value should be set at more preferably 4.0.

Of Condition (10B), the lower limit value should be set at more preferably 1.17, even more preferably 1.19, and the upper limit value should be set at more preferably 1.5.

Of Condition (11B), the lower limit should be set at more preferably 0.40, and the upper limit value should be set at more preferably 0.72.

Still other objects and advantages of the invention will in part be obvious and will in par be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 10 is a set of aberration diagrams for the zoom lens of Example 1.

FIG. 12 is a set of aberration diagrams for the zoom lens of Example 2.

FIG. 16 is a set of aberration diagrams for the zoom lens of Example 4.

FIG. 17 is a set of aberration diagrams for the zoom lens of Example 5.

FIG. 19 is a set of aberration diagrams for the zoom lens of Example 6

FIG. 20 is a set of aberration diagrams for the zoom lens of Example 6.

DESCRIPTION OF EXEMPLARY EMBODIMENTS

The following examples are each directed to a zoom lens that is used as an interchangeable lens attached to a quick-return mirror-free camera body and capable of taking moving images: a wide-angle, high-zooming zoom lens having a focal length of about 24 to 28 mm at the wide-angle end as calculated on a 35 mm image plane basis and a zoom ratio of about 5 to 10.

The zoom lenses of Examples 1 to 7 are now explained with reference to the accompanying drawings. FIGS. 2 to 8 are sectional views of the zoom lenses of Examples 1 to 7 as taken apart along the optical axis. In each drawing, (a), (b) and (c) are indicative of the wide-angle end (WE), the intermediate setting (ST) and the telephoto end (TE), respectively.

Figure 1:
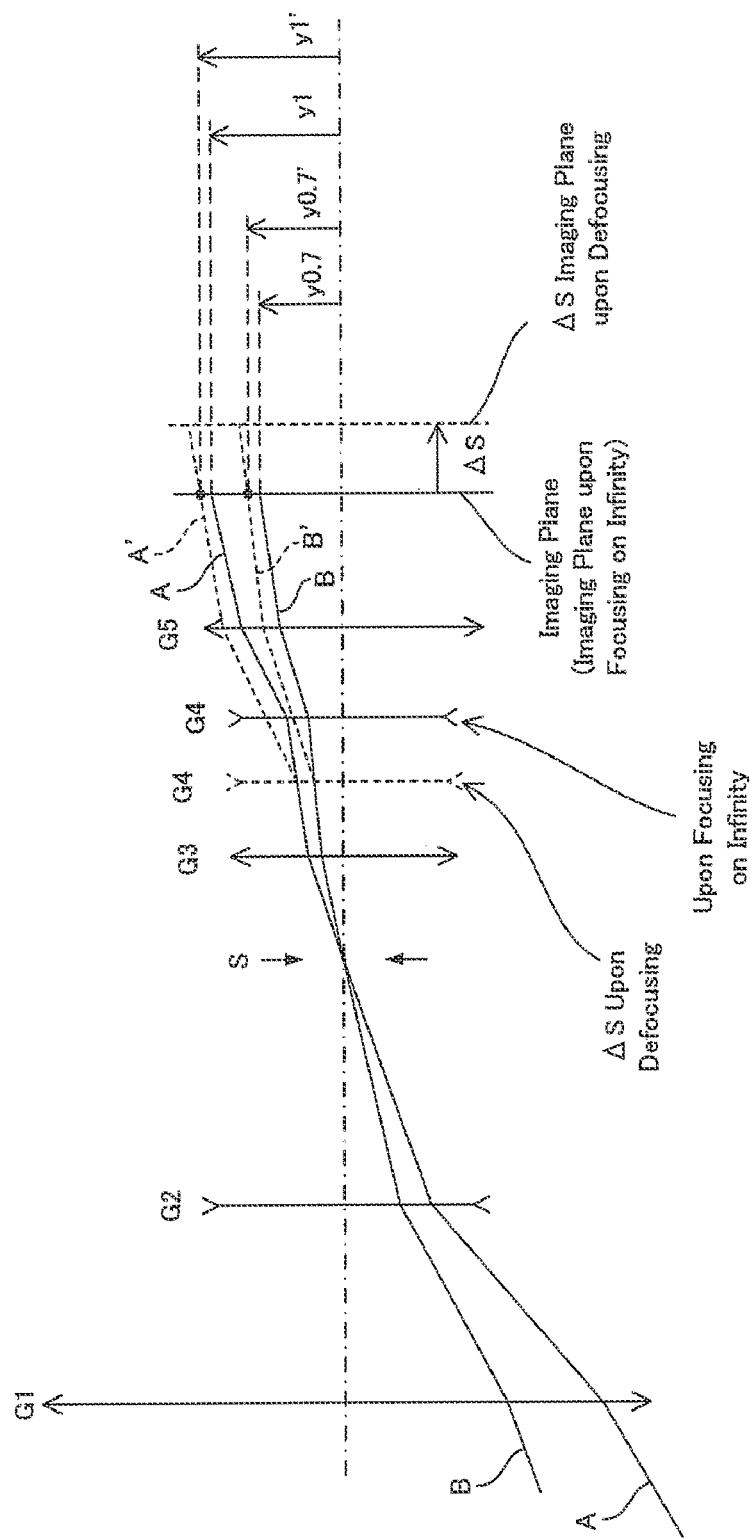
FIG. 1 is illustrative in schematic of the definition of the conditions for the zoom lens according to a specific embodiment of the invention.
Figure 2:
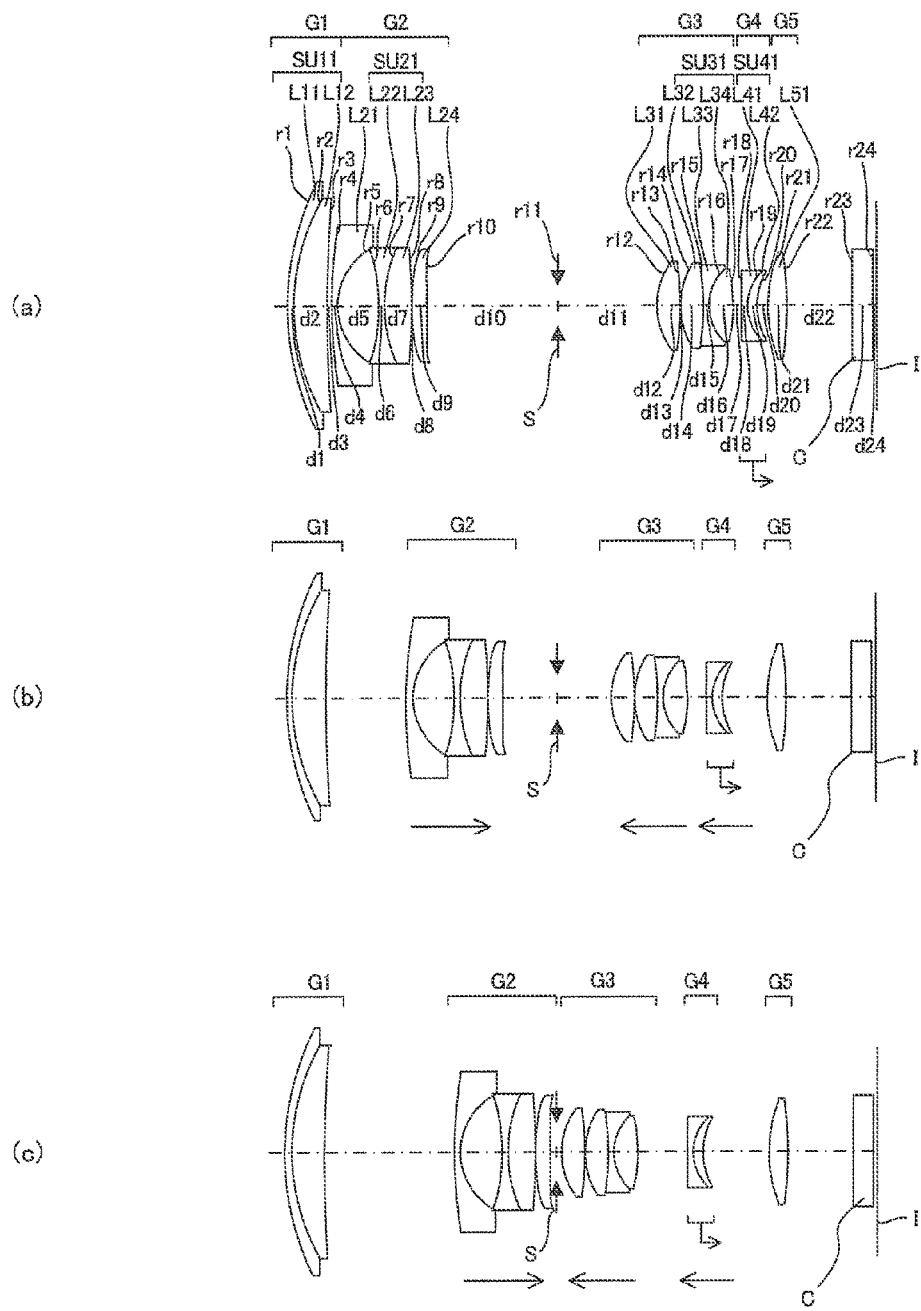
FIG. 2 is illustrative in section of the zoom lens of Example 1 as taken apart along the optical axis.

FIG. 2 is illustrative in section of the zoom lens of Example 1.

More specifically, Example 1 is directed to a wide-angle, high-zooming zoom lens having a focal length of 24 mm at the wide-angle end as calculated on a 35 mm image plane basis and a zoom ratio of about 5.

As shown in FIG. 2, the zoom lens of Example 1 is built up of, in order from the object side to the image side, a first lens group G1 of positive refracting power, a second lens group G2 of negative refracting power, a third lens group G3 of positive refracting power, a fourth lens group G4 of negative refracting power and a fifth lens group G5 of positive refracting power. In FIG. 2, S, I and C stand for an aperture stop, an image plane and a cover glass, respectively.

The first lens group G1 is made up of a cemented lens SU11 of, in order from the object side to the image side, a negative meniscus lens L11 convex on its object side and a positive meniscus lens L12 convex on its object side.

The second lens group G2 is made up of, in order from the object side to the image side, a negative meniscus lens L21 convex on its object side, a cemented lens SU21 of a double-concave negative lens L22 and a double-convex positive lens L23, and a double-convex positive lens L24.

The third lens group G3 is made up of, in order from the object side to the image side, a double-convex positive lens L31 and a cemented lens SU31 of a double-convex positive lens L32, a double-concave negative lens L33 and a double-convex positive lens L34.

The fourth lens group G4 is made up of a cemented lens SU41 of a double-concave negative lens L41 and a positive meniscus lens L42 convex on its object side.

The fifth lens group G5 is made up of a double-convex positive lens L51.

How the zoom lens of Example 1 operates is now explained. During zooming operation, the first lens group G1, the aperture stop S and the fifth lens group G5 remain fixed, and the second lens group G2, the third lens group G3 and the fourth lens group G4 move independently.

Upon zooming from the wide-angle end to the telephoto end, the second lens group G2 moves to the image side with a widening of the separation between it and the first lens group G1 and a narrowing of the separation between it and the aperture stop S. Upon zooming from the wide-angle end to the telephoto end, the third lens group G3 moves to the object side with a narrowing of the separation between it and the aperture stop S and a widening of the separation between it and the fourth lens group G4. Upon zooming from the wide-angle end to the telephoto end, the fourth lens group G4 moves to the object side with a widening of the separation between it and the third lens group G3 and a widening of the separation between it and the fifth lens group G5.

Focusing operation, and wobbling operation runs at the fourth lens group G4. Upon focusing from infinity to a near distance, the fourth lens group G4 moves to the image side.

Seven aspheric surfaces are applied: two to both surfaces r9 and r10 of the double-convex positive lens L24 in the second lens group G2, two to both surfaces r12 and r13 of the double-convex positive lens L31 in the third lens group G3, one to the image-side surface r17 of the double-convex positive lens L34 in the cemented lens SU31 in the third lens group G3, and two to both surfaces r21 and r22 of the double-convex positive lens L51 forming the fifth lens group G5.

Figure 3:
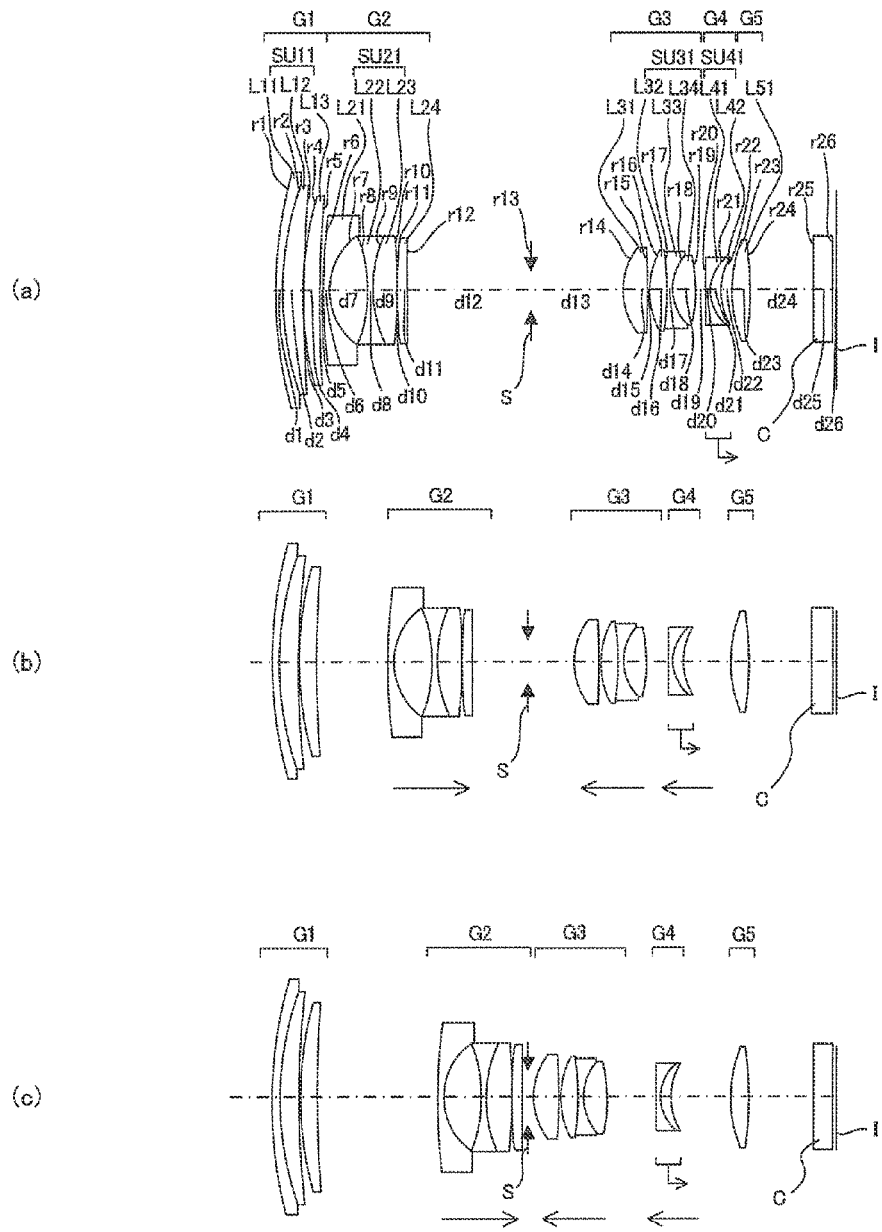
FIG. 3 is illustrative in section of the zoom lens of Example 2 as taken apart along the optical axis.

FIG. 3 is illustrative in section of the zoom lens of Example 2.

More specifically, Example 2 is directed to a wide-angle, high-zooming zoom lens having a focal length of 24 mm at the wide-angle end as calculated on a 35 mm image plane basis and a zoom ratio of about 5.

As shown in FIG. 3, the zoom lens of Example 2 is built up of, in order from the object side to the image side, a first lens group G1 of positive refracting power, a second lens group G2 of negative refracting power, a third lens group G3 of positive refracting power, a fourth lens group G4 of negative refracting power and a fifth lens group G5 of positive refracting power. In FIG. 3, S, I and C stand for an aperture stop, an image plane and a cover glass, respectively.

The first lens group G1 is made up of, in order from the objet side to the image side, a cemented lens SU11 of a negative meniscus lens L11 convex on its object side and a positive meniscus lens L12 convex on its object side, and a positive meniscus lens L13 convex on its object side.

The second lens group G2 is made up of, in order from the object side to the image side, a negative meniscus lens L21 convex on its object side, a cemented lens SU21 of a double-concave negative lens L22 and a double-convex positive lens L23, and a double-convex positive lens L24.

The third lens group G3 is made up of, in order from the object side to the image side, a double-convex positive lens L31 and a cemented lens SU31 of a double-convex positive lens L32, a double-concave negative lens L33 and a double-convex positive lens L34.

The fourth lens group G4 is made up of a cemented lens SU41 of a double-concave negative lens L41 and a positive meniscus lens L42 convex on its object side.

The fifth lens group G5 is made up of a double-convex positive lens L51.

How the zoom lens of Example 2 operates is now explained. During zoom operation, the first lens group G1, the aperture stop S, and the fifth lens group G5 remains fixed, and the second lens group G2, the third lens group G3 and the fourth lens group G4 move independently.

Upon zooming from the wide-angle end to the telephoto end, the second lens group G2 moves to the image side with a widening of the separation between it and the first lens group G1 and a narrowing of the separation between it and the aperture stop S. From the wide-angle end to the telephoto end, the third lens group G3 moves to the object side with a narrowing of the separation between it and the aperture stop S and a widening of the separation between it and the fourth lens group G4. From the wide-angle end to the telephoto end, the fourth lens group G4 moves to the object side with a widening of the separation between it and the third lens group G3 and a widening of the separation between it and the fifth lens group G5.

Focusing operation, and wobbling operation runs at the fourth lens group G4. Upon focusing from infinity to a near distance, the fourth lens group G4 moves to the image side.

Seven aspheric surfaces are applied: two to both surfaces r11 and r12 of the double-convex positive lens L24 in the second lens group G2, two to both surfaces r14 and r15 of the double-convex positive lens L31 in the third lens group G3, one to the image-side surface r19 of the image-side surface of the double-convex positive lens L34 in the cemented lens SU31 in the third lens group G3, and two to both surfaces r23 and r24 of the double-convex positive lens L51 forming the fifth lens group G5.

Figure 4:
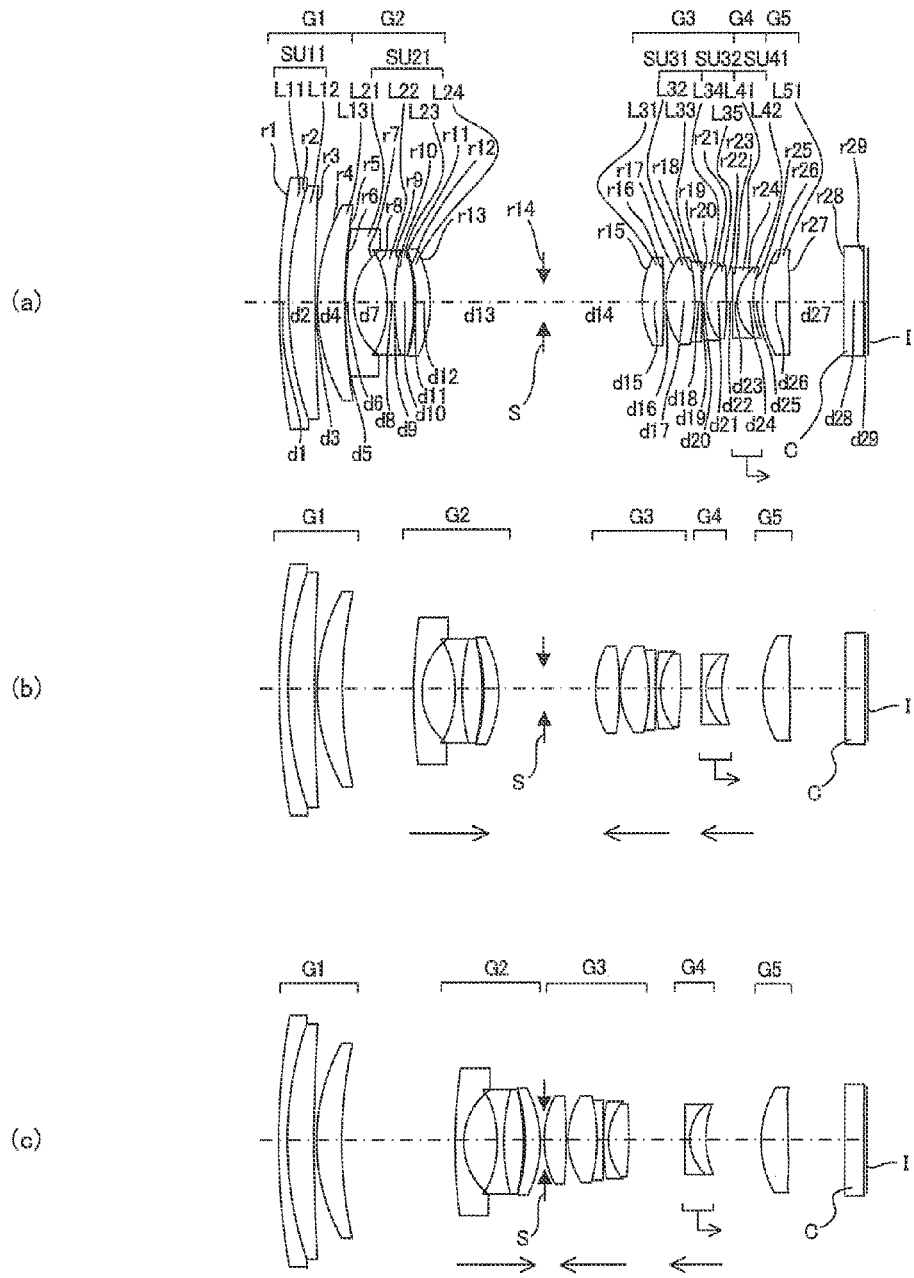
FIG. 4 is illustrative in section of the zoom lens of Example 3 as taken apart along the optical axis.

FIG. 4 is illustrative in section of the zoom lens of Example 3.

More specifically, Example 3 is directed to a wide-angle, high-zooming zoom lens having a focal length of 24 mm at the wide-angle end as calculated on a 35 mm image plane basis and a zoom ratio of about 6.

As shown in FIG. 4, the zoom lens of Example 3 is built up of, in order from the object side to the image side, a first lens group G1 of positive refracting power, a second lens group G2 of negative refracting power, a third lens group G3 of positive refracting power, a fourth lens group G4 of negative refracting power and a fifth lens group G5 of positive refracting power. In FIG. 4, S, I and C stand for an aperture stop, an image plane and a cover glass, respectively.

The first lens group G1 is made up of, in order from the objet side to the image side, a cemented lens SU11 of a negative meniscus lens L11 convex on its object side and a positive meniscus lens L12 convex on its object side, and a positive meniscus lens L13 convex on its object side.

The second lens group G2 is made up of, in order from the object side to the image side, a negative meniscus lens L21 convex on its object side, a cemented lens SU21 of a double-concave negative lens L22 and a double-convex positive lens L23, and a positive meniscus lens L24 convex on its image side.

The third lens group G3 is made up of, in order from the object side to the image side, a double-convex positive lens L31, a cemented lens SU31 of a double-convex positive lens L32 and a double-concave negative lens L33, and a cemented lens SU32 of a negative meniscus lens L34 convex on its object side and a double-convex positive lens L35.

The fourth lens group G4 is made up of a cemented lens SU41 of a negative meniscus lens L41 convex on its object side and a positive meniscus lens L42 convex on its object side.

The fifth lens group G5 is made up of a double-convex positive lens L51.

How the zoom lens of Example 3 operates is now explained. During zoom operation, the first lens group G1, the aperture stop S, and the fifth lens group G5 remains fixed, and the second lens group G2, the third lens group G3 and the fourth lens group G4 move independently.

Upon zooming from the wide-angle end to the telephoto end, the second lens group G2 moves to the image side with a widening of the separation between it and the first lens group G1 and a narrowing of the separation between it and the aperture stop S. From the wide-angle end to the telephoto end, the third lens group G3 moves to the object side with a narrowing of the separation between it and the aperture stop S and a widening of the separation between it and the fourth lens group G4. From the wide-angle end to the telephoto end, the fourth lens group G4 moves to the object side with a widening of the separation between it and the third lens group G3 and a widening of the separation between it and the fifth lens group G5.

Focusing operation, and wobbling operation runs at the fourth lens group G4. Upon focusing from infinity to a near distance, the fourth lens group G4 moves to the image side.

Eight aspheric surfaces are applied: one to the image-side surface r7 of the negative meniscus lens L21 in the second lens group G2, two to both surfaces r12 and r13 of the positive meniscus lens L24 in the second lens group G2, two to both surfaces r15 and r16 of the double-convex positive lens L31 in the third lens group G3, one to the image-side surface r22 of the double-convex positive lens L35 in the cemented lens SU32 in the third lens group G3, and two to both surfaces r26 and r27 of the double-convex positive lens L51 forming the fifth lens group G5.

Figure 5:
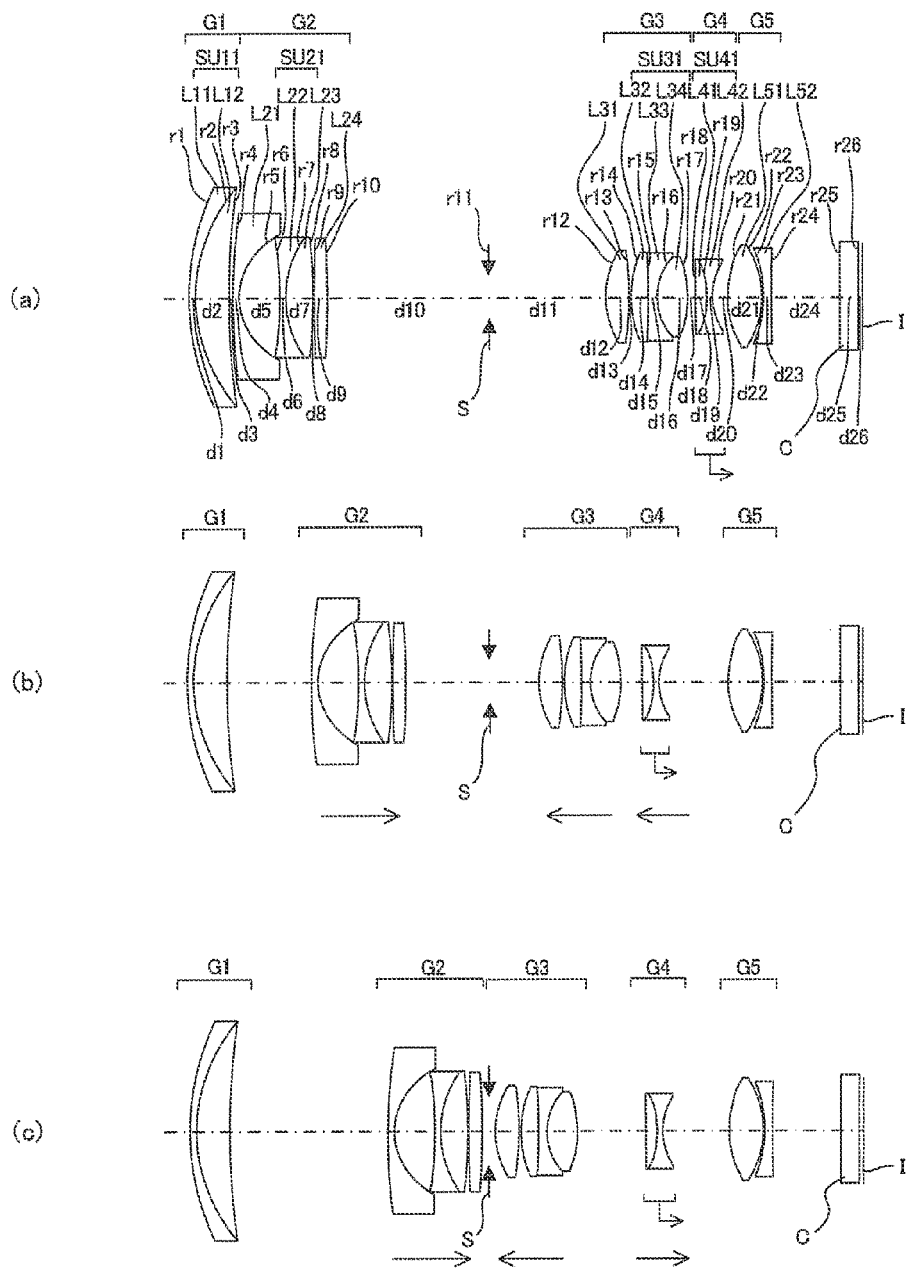
FIG. 5 is illustrative in section of the zoom lens of Example 4 as taken apart along the optical axis.

FIG. 5 is illustrative in section of the zoom lens of Example 4.

More specifically, Example 4 is directed to a wide-angle, high-zooming zoom lens having a focal length of 24 mm at the wide-angle end as calculated on a 35 mm image plane basis and a zoom ratio of about 7.

As shown in FIG. 5, the zoom lens of Example 4 is built up of, in order from the object side to the image side, a first lens group G1 of positive refracting power, a second lens group G2 of negative refracting power, a third lens group G3 of positive refracting power, a fourth lens group G4 of negative refracting power and a fifth lens group G5 of positive refracting power. In FIG. 5, S, I and C stand for an aperture stop, an image plane and a cover glass, respectively.

The first lens group G1 is made up of a cemented lens SU11 of, in order from the object side to the telephoto end, a negative meniscus lens L11 convex on its object side and a positive meniscus lens L12 convex on its object side.

The second lens group G2 is made up of, in order from the object side to the image side, a negative meniscus lens L21 convex on its object side, a cemented lens SU21 of a double-concave negative lens L22 and a double-convex positive lens L23, and a positive meniscus lens L24 convex on its object side.

The third lens group G3 is made up of, in order from the object side to the image side, a double-convex positive lens L31 and a cemented lens SU31 of a double-convex positive lens L32, a double-concave negative lens L33 and a double-convex positive lens L34.

The fourth lens group G4 is made up of a cemented lens SU41 of a positive meniscus lens L41 convex on its image side and a double-concave negative lens L42.

The fifth lens group G5 is made up of a double-convex positive lens L51 and a double-concave negative lens L52.

How the zoom lens of Example 4 operates is now explained. During zoom operation, the first lens group G1, the aperture stop S, and the fifth lens group G5 remains fixed, and the second lens group G2, the third lens group G3 and the fourth lens group G4 move independently.

Upon zooming from the wide-angle end to the telephoto end, the second lens group G2 moves to the image side with a widening of the separation between it and the first lens group G1 and a narrowing of the separation between it and the aperture stop S. From the wide-angle end to the telephoto end, the third lens group G3 moves to the object side with a narrowing of the separation between it and the aperture stop S and a widening of the separation between it and the fourth lens group G4. From the wide-angle end to the intermediate setting, the fourth lens group G4 moves to the object side with a widening of the separation between it and the third lens group G3 and a widening of the separation between it and the fifth lens group G5, and from the intermediate setting to the telephoto end, moves to the image side with a widening of the separation between it and the third lens group G3 and a narrowing of the separation between it and the fifth lens group G5.

Focusing operation, and wobbling operation runs at the fourth lens group G4. Upon focusing from infinity to a near distance, the fourth lens group G4 moves to the image side.

Eight aspheric surfaces are applied: two to both surfaces r9 and r10 of the positive meniscus lens L24 in the second lens group G2, two to both surfaces r12 and r13 of the double-convex positive lens L34 in and on the most image side of the cemented lens SU31 in the third lens group G3, one to the image-side surface r17 of the image-side double-convex lens L34 in the SU31 in the third lens group G3, one to the image-side surface r20 of the double-concave negative lens L42 of the cemented lens SU41 in the fourth lens group G4, and two to both surfaces r21 and r22 of the double-convex positive lens L51 in the fifth lens group G5.

Figure 6:
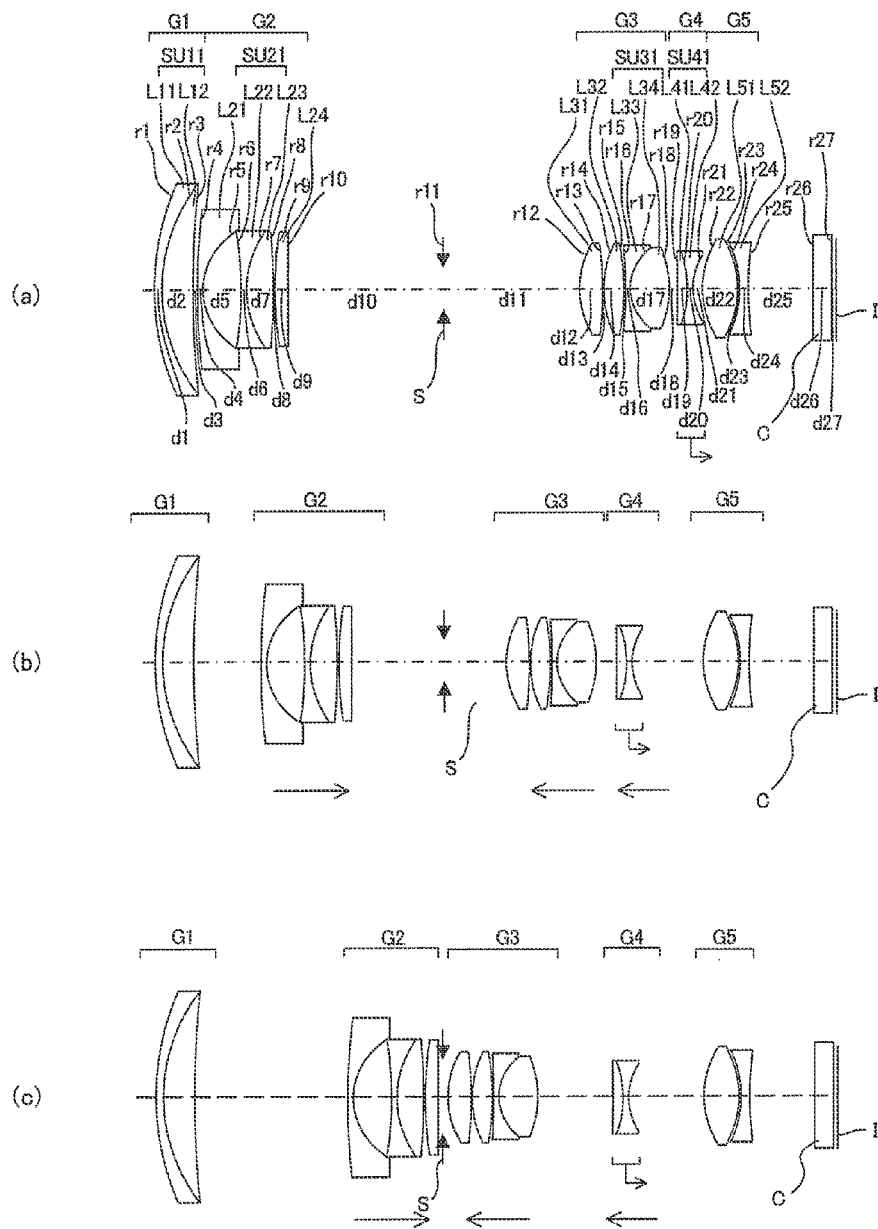
FIG. 6 is illustrative in section of the zoom lens of Example 5 as taken apart along the optical axis.

FIG. 6 is a sectional view of the zoom lens of Example 5.

More specifically, Example 5 is directed to a wide-angle, high-zooming zoom lens having a focal length of 24 mm at the wide-angle end as calculated on a 35 mm image plane basis and a zoom ratio of about 8.

As shown in FIG. 6, the zoom lens of Example 5 is built up of, in order from the object side to the image side, a first lens group G1 of positive refracting power, a second lens group G2 of negative refracting power, a third lens group G3 of positive refracting power, a fourth lens group G4 of negative refracting power and a fifth lens group G5 of positive refracting power. In FIG. 6, S, and C stand for an aperture stop, an image plane and a cover glass, respectively.

The first lens group G1 is made up of, in order from the objet side to the image side, a cemented lens SU11 of a negative meniscus lens L11 convex on its object side and a positive meniscus lens L12 convex on its object side.

The second lens group G2 is made up of, in order from the object side to the image side, a negative meniscus lens L21 convex on its object side, a cemented lens SU21 of a double-concave negative lens L22 and a double-convex positive lens L23, and a positive meniscus lens L24 convex on its object side.

The third lens group G3 is made up of, in order from the object side to the image side, a double-convex positive lens L31, a double-convex positive lens L32 and a cemented lens SU31 of a double-concave negative lens L33 and a double-convex positive lens L34.

The fourth lens group G4 is made up of a cemented lens SU41 of a positive meniscus lens L41 convex on its image side and a double-concave negative lens L42.

The fifth lens group G5 is made up of a double-convex positive lens L51 and a double-concave negative lens L52.

How the zoom lens of Example 5 operates is now explained. During zoom operation, the first lens group G1, the aperture stop S, and the fifth lens group G5 remains fixed, and the second lens group G2, the third lens group G3 and the fourth lens group G4 move independently.

Upon zooming from the wide-angle end to the telephoto end, the second lens group G2 moves to the image side with a widening of the separation between it and the first lens group G1 and a narrowing of the separation between it and the aperture stop S. From the wide-angle end to the telephoto end, the third lens group G3 moves to the object side with a narrowing of the separation between it and the aperture stop S and a widening of the separation between it and the fourth lens group G4. From the wide-angle end to the telephoto end, the fourth lens group G4 moves to the object side with a widening of the separation between it and the third lens group G3 and a widening of the separation between it and the fifth lens group G5.

Focusing operation, and wobbling operation runs at the fourth lens group G4. Upon focusing from infinity to a near distance, the fourth lens group G4 moves to the image side.

Eight aspheric surfaces are applied: two to both surfaces r9 and r10 of the positive meniscus lens L24 in the second lens group G2, two to both surfaces r12 and r13 of the double-convex positive lens L31 in and on the most image side of the cemented lens SU31 in the third lens group G3, one to the image-side surface r18 of the double-convex positive lens of the double-convex positive lens L34 in and on the most image side of the cemented lens SU31 in the third lens group G3, one to the image-side surface r21 of the double-concave negative lens L42 in the cemented lens SU41 in the fourth lens group G4, and two to both surfaces r22 and r23 of the double-convex positive lens L51 in the fifth lens group G5.

Figure 7:
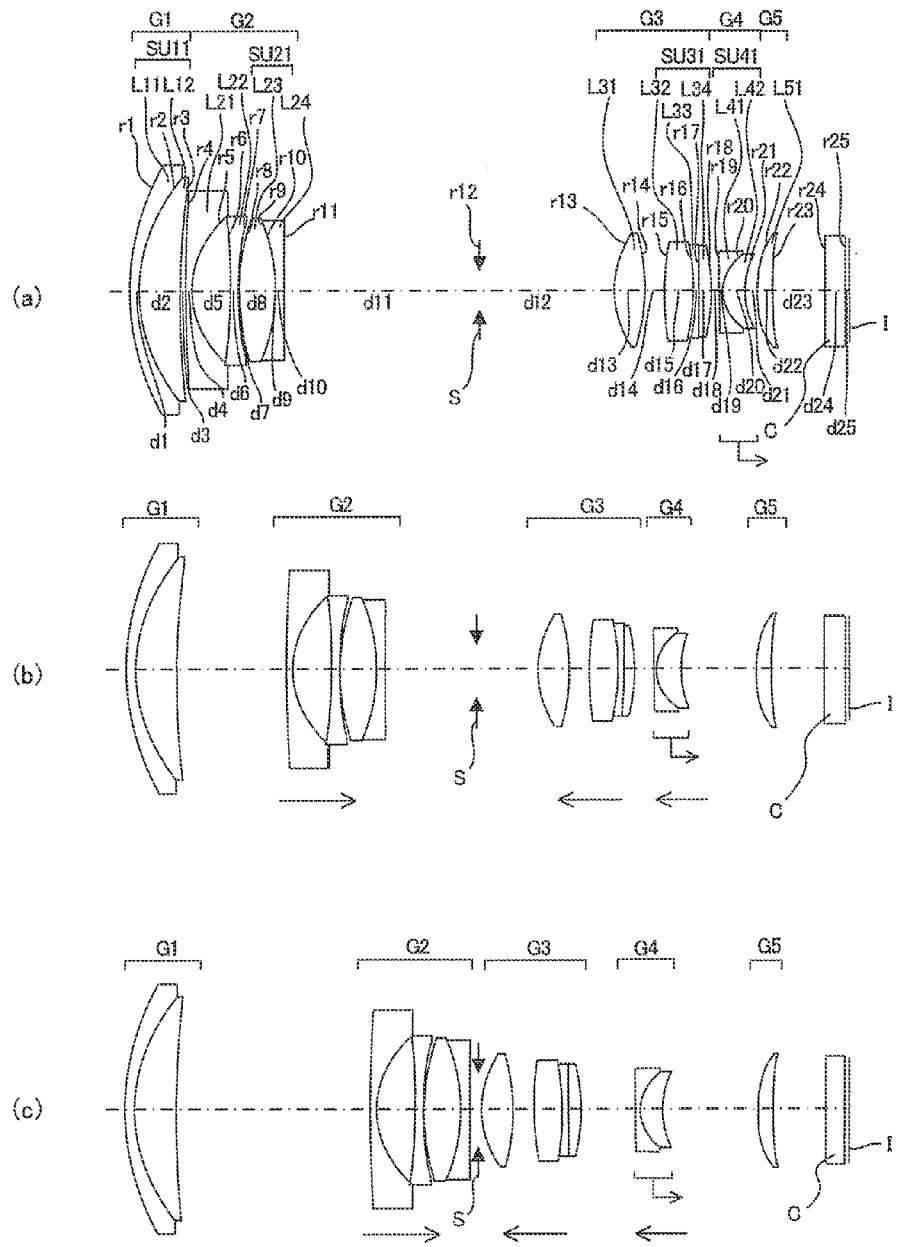
FIG. 7 is illustrative in section of the zoom lens of Example 6 as taken apart along the optical axis.

FIG. 7 is a sectional view of the zoom lens of Example 6.

More specifically, Example 6 is directed to a wide-angle, high-zooming zoom lens having a focal length of 24 mm at the wide-angle end as calculated on a 35 mm image plane basis and a zoom ratio of about 10.

As shown in FIG. 7, the zoom lens of Example 6 is built up of, in order from the object side to the image side, a first lens group G1 of positive refracting power, a second lens group G2 of negative refracting power, a third lens group G3 of positive refracting power, a fourth lens group G4 of negative refracting power and a fifth lens group G5 of positive refracting power. In FIG. 7, S, I and C stand for an aperture stop, an image plane and a cover glass, respectively.

The first lens group G1 is made up of a cemented lens SU11 of, in order from the object side to the telephoto end, a negative meniscus lens L11 convex on its object side and a positive meniscus lens L12 convex on its object side.

The second lens group G2 is made up of, in order from the object side to the image side, a negative meniscus lens L21 convex on its object side, a double-concave negative lens L22 and a cemented lens SU21 of a double-convex positive lens L22 and a negative meniscus lens L24 convex on its image side.

The third lens group G3 is made up of, in order from the object side to the image side, a double-convex positive lens L31 and a cemented lens SU31 of a double-convex positive lens L32, a double-concave negative lens L33 and a double-convex positive lens L34.

The fourth lens group G4 is made up of a cemented lens SU41 of a negative meniscus lens L41 convex on its object side and a positive meniscus lens L42 convex on its object side.

The firth lens group G5 is made up of a double-convex positive lens L51.

How the zoom lens of Example 6 operates is now explained. During zoom operation, the first lens group G1, the aperture stop S, and the fifth lens group G5 remains fixed, and the second lens group G2, the third lens group G3 and the fourth lens group G4 move independently.

Upon zooming from the wide-angle end to the telephoto end, the second lens group G2 moves to the image side with a widening of the separation between it and the first lens group G1 and a narrowing of the separation between it and the aperture stop S. From the wide-angle end to the telephoto end, the third lens group G3 moves to the object side with a narrowing of the separation between it and the aperture stop S and a widening of the separation between it and the fourth lens group G4. From the wide-angle end to the telephoto end, the fourth lens group G4 moves to the object side with a widening of the separation between it and the third lens group G3 and a widening of the separation between it and the fifth lens group G5.

Focusing operation, and wobbling operation runs at the fourth lens group G4. Upon focusing from infinity to a near distance, the fourth lens group G4 moves to the image side.

Seven aspheric surfaces are applied: two to both surfaces r6 and r7 of the double-concave negative lens L22 in the second lens group G2, two to both surfaces r13 and r14 of the double-convex positive lens L31 in and on the most object side of the third lens group G3, one to the image-side surface r18 of the double-convex positive lens L34 in and on the most image side of the cemented lens SU31 in the third lens group G3, and two to both surfaces r22 and r23 of the double-convex positive lens L51 forming the fifth lens group G5.

Figure 8:
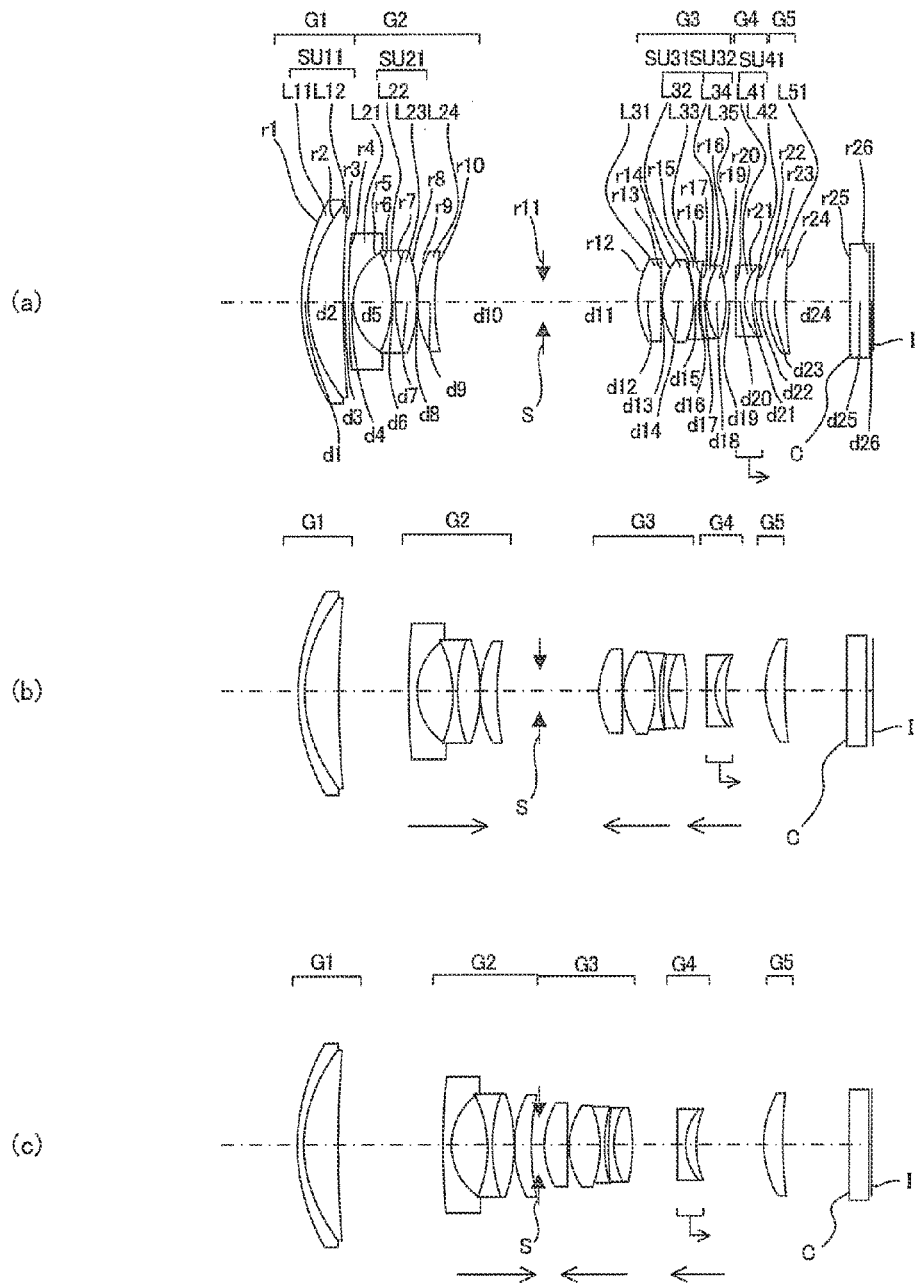
FIG. 8 is illustrative in section of the zoom lens of Example 7 as taken apart along the optical axis.
Figure 9:
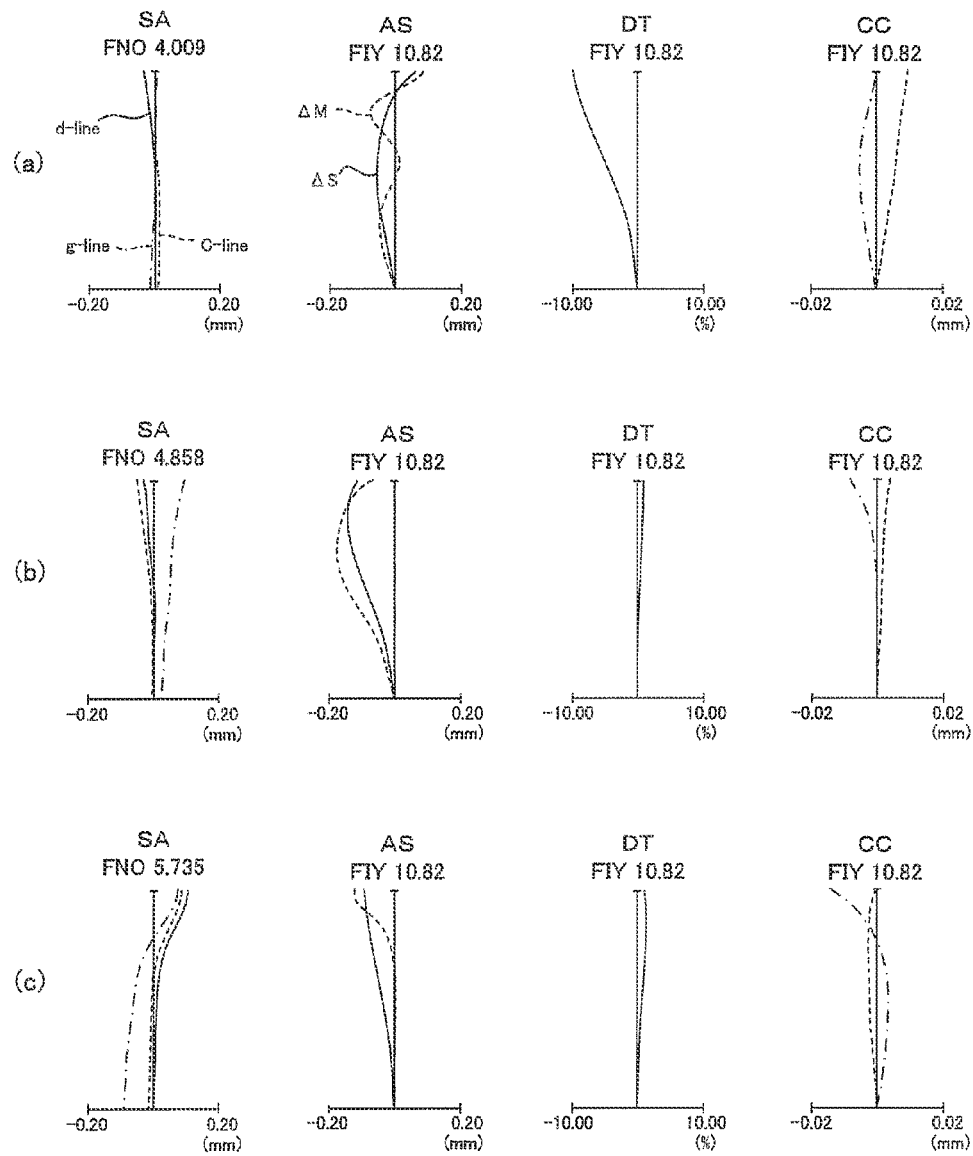
FIG. 9 is a set of aberration diagrams for the zoom lens of Example 1.
Figure 11:
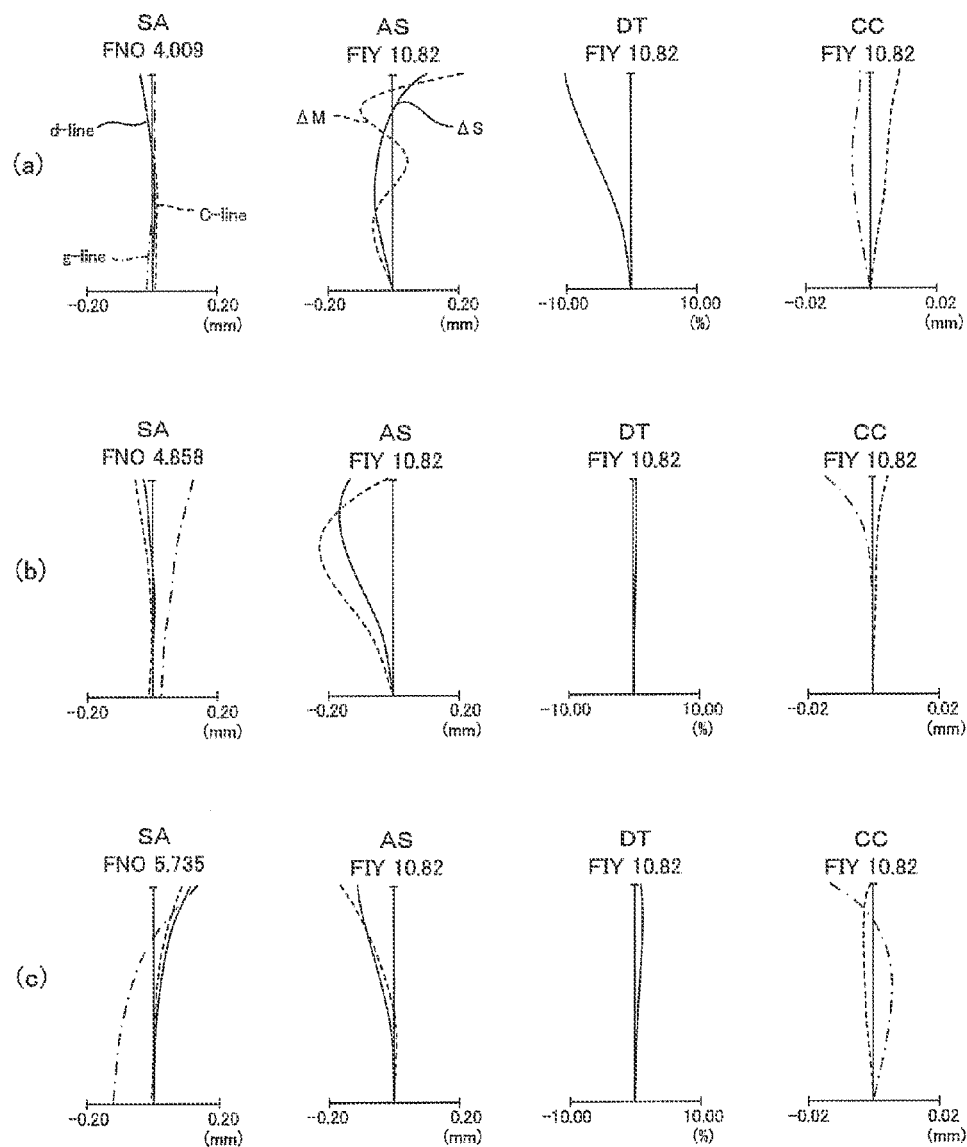
FIG. 11 is a set of aberration diagrams for the zoom lens of Example 2.
Figure 13:
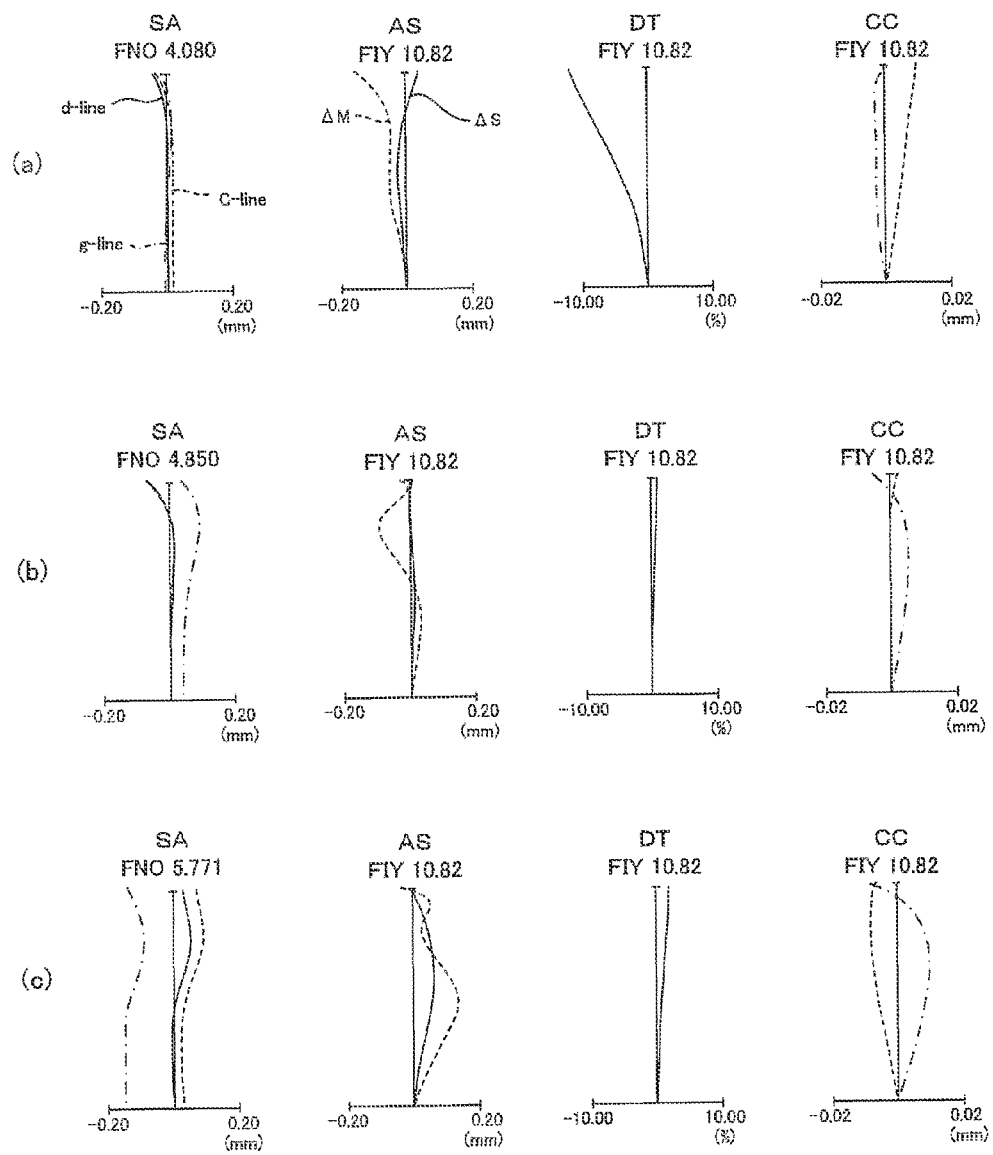
FIG. 13 is a set of aberration diagrams for the zoom lens of Example 3.

FIG. 8 is a sectional view of the zoom lens of Example 7.

More specifically, Example 7 is directed to a wide-angle, high-zooming zoom lens having a focal length of 28 mm at the wide-angle end as calculated on a 35 mm image plane basis and a zoom ratio of about 5.

As shown in FIG. 8, the zoom lens of Example 7 is built up of, in order from the object side to the image side, a first lens group G1 of positive refracting power, a second lens group G2 of negative refracting power, a third lens group G3 of positive refracting power, a fourth lens group G4 of negative refracting power and a fifth lens group G5 of positive refracting power. In FIG. 8, S, I and C stand for an aperture stop, an image plane and a cover glass, respectively.

The first lens group G1 is made up of a cemented lens SU11 of, in order from the object side to the telephoto end, a negative meniscus lens L11 convex on its object side and a positive meniscus lens L12 convex on its object side.

The second lens group G2 is made up of, in order from the object side to the image side, a negative meniscus lens L21 convex on its object side, a cemented lens SU21 of a double-concave negative lens L22 and a double-convex positive lens L23, and a positive meniscus lens L24 convex on its object side.

The third lens group G3 is made up of, in order from the object side to the image side, a double-convex positive lens L31, a cemented lens SU31 of a double-convex positive lens L32 and a double-concave negative lens L33, and a cemented lens SU32 of a negative meniscus lens L34 convex on its object side and a double-convex positive lens L35.

The fourth lens group G4 is made up of a cemented lens SU41 of a negative meniscus lens L41 convex on its object side and a positive meniscus lens L42 convex on its object side.

The firth lens group G5 is made up of a positive meniscus lens L51 convex on its object side.

How the zoom lens of Example 7 operates is now explained. During zoom operation, the first lens group G1, the aperture stop S, and the fifth lens group G5 remains fixed, and the second lens group G2, the third lens group G3 and the fourth lens group G4 move independently.

Upon zooming from the wide-angle end to the telephoto end, the second lens group G2 moves to the image side with a widening of the separation between it and the first lens group G1 and a narrowing of the separation between it and the aperture stop S. From the wide-angle end to the telephoto end, the third lens group G3 moves to the object side with a narrowing of the separation between it and the aperture stop S and a widening of the separation between it and the fourth lens group G4. From the wide-angle end to the telephoto end, the fourth lens group G4 moves to the object side with a widening of the separation between it and the third lens group G3 and a widening of the separation between it and the fifth lens group G5.

Focusing operation, and wobbling operation runs at the fourth lens group G4. Upon focusing from infinity to a near distance, the fourth lens group G4 moves to the image side.

Five aspheric surfaces are applied: two to both surfaces r9 and r10 of the positive meniscus lens L24 in the second lens group G2, two to both surfaces r12 and r13 of the double-convex positive lens L31 in and on the most object side of the third lens group G3, and one to the image-side surface r19 of the double-convex positive lens L34 in the image-side cemented lens SU32 in the third lens group G3.

Set out below are a variety of numeral data on Examples 1 to 7 (surface data, aspheric data, variable separation data, data set 1, data set 2).

The surface data include, for each Surface No., the radius r of curvature and surface separation d of the lens surface (optical surface), the d-line (587.6 nm) refractive index nd of the lens (optical medium), and the d-line Abbe constant vd of the lens (optical medium). The radius r of curvature, and the surface separation d is given in mm. Of the surface data, "∞" attached to the radius of curvature means infinity.

Referring to aspheric data, data about the aspheric lens surfaces are given in the surface data. Suppose here that x is an optical axis provided that the direction of travel of light is taken as positive, and y is the direction orthogonal to the optical axis. Then the aspheric shape is represented by the following formula:

$$x=(y^2/r)/\{1+\{1-(1+K)\cdot(y/r)^2\}^{1/2}\}+A4y^4+A6y^6+A8y^8+A10y^{10}$$

In that formula, r is the paraxial radius of curvature, K is the conic coefficient, and A4, A6, A8 and A10 are the $4^{th}$-, $6^{th}$-, $8^{th}$- and $10^{th}$-order aspheric coefficients. It is here noted that the capital "E" indicates that the following numerical value is a power exponent with 10 as base; for instance, "1.0E-5" means "$1.0\times10^{-5}$".

Data set 1 includes various zoom data at the wide-angle end (WE), in the intermediate setting (ST) and at the telephoto end (TE). The zoom data include focal lengths, F-numbers (Fno), angles of view (2ω), image heights, back focuses (BF), and variable surface separations d, and data set 2 includes focal lengths f1 to f5 of the first to fifth lens groups.

NUMERAL EXAMPLE 1

| Surface No. | r | d | nd | vd |
|---|---|---|---|---|
| 1 | 56.912 | 1.40 | 1.84666 | 23.78 |
| 2 | 45.147 | 6.69 | 1.72916 | 54.68 |
| 3 | 283.392 | D3 (variable) | | |
| 4 | 111.625 | 1.20 | 1.83481 | 42.71 |
| 5 | 13.602 | 8.52 | | |
| 6 | −34.083 | 1.10 | 1.78800 | 47.37 |
| 7 | 28.705 | 5.46 | 1.84666 | 23.78 |
| 8 | −132.078 | 0.10 | | |
| 9 (Aspheric Surface) | 82.320 | 2.98 | 1.52542 | 55.78 |
| 10 (Aspheric Surface) | −127.407 | D10 (variable) | | |
| 11 (Stop) | ∞ | D11 (variable) | | |
| 12 (Aspheric Surface) | 14.782 | 4.64 | 1.49700 | 81.54 |
| 13 (Aspheric Surface) | −58.889 | 0.10 | | |
| 14 | 16.190 | 4.52 | 1.51633 | 64.14 |
| 15 | −71.730 | 1.35 | 1.88300 | 40.76 |
| 16 | 10.334 | 4.77 | 1.49700 | 81.54 |
| 17 (Aspheric Surface) | −26.510 | D17 (variable) | | |
| 18 | −589.551 | 1.00 | 1.80400 | 46.57 |
| 19 | 9.438 | 2.06 | 1.84666 | 23.78 |
| 20 | 13.756 | D20 (variable) | | |
| 21 (Aspheric Surface) | 30.356 | 3.90 | 1.51633 | 64.14 |
| 22 (Aspheric Surface) | −70.714 | 13.40 | | |
| 23 | ∞ | 4.00 | 1.51633 | 64.14 |
| 24 | ∞ | 0.8 | | |
| Image Plane | ∞ | | | |

Aspheric Data

9th Surface

K = 0.000, A4 = 4.81480E−05, A6 = −9.50101E−08, A8 = 3.10123E−09, A10 = −1.06248E−11

10th Surface

K = 0.000, A4 = 3.17860E−05, A6 = −5.95034E−08, A8 = 3.20925E−09, A10 = −1.28394E−11

12th Surface

K = 0.000, A4 = −2.14397E−05, A6 = 3.59448E−07, A8 = −7.60025E−09, A10 = 5.16822E−11

13th Surface

K = 0.000, A4 = 1.62633E−05, A6 = 4.03049E−07, A8 = −9.70801E−09, A10 = 6.87773E−11

17th Surface

K = 0.000, A4 = 6.31351E−05, A6 = 4.29315E−07, A8 = 1.99802E−10, A10 = 6.12862E−11

21th Surface

K = 0.000, A4 = 3.73857E−05, A6 = −2.93542E−07, A8 = 1.94813E−09, A10 = −1.45331E−11

22th Surface

K = 0.000, A4 = 3.31689E−05, A6 = −3.17518E−07, A8 = 1.80831E−09, A10 = −1.49415E−11

Data Set 1
Zoom Data

| | WE | ST | TE |
|---|---|---|---|
| Focal Length | 12.24 | 26.80 | 59.00 |
| Fno | 4.01 | 4.86 | 5.73 |
| Angle of View (2 ω) | 88.94 | 43.60 | 20.58 |
| Image Height | 10.82 | 10.82 | 10.82 |
| D3 | 0.80 | 16.31 | 26.27 |
| D10 | 26.47 | 10.96 | 1.00 |
| D11 | 20.11 | 10.70 | 1.00 |
| D17 | 1.80 | 4.15 | 10.07 |
| D20 | 2.17 | 9.23 | 13.01 |
| fb (in air) | 16.84 | 16.84 | 16.84 |
| Full Lens Length (in air) | 117.98 | 117.98 | 117.98 |

Data Set 2

| | |
|---|---|
| f 1 | 101.20 |
| f 2 | −18.57 |
| f 3 | 19.33 |
| f 4 | −17.18 |
| f 5 | 41.68 |

NUMERAL EXAMPLE 2

| Surface No. | r | d | nd | vd |
|---|---|---|---|---|
| 1 | 96.811 | 1.40 | 1.84666 | 23.78 |
| 2 | 69.422 | 4.11 | 1.72916 | 54.68 |
| 3 | 222.222 | 0.10 | | |
| 4 | 73.312 | 3.45 | 1.72916 | 54.68 |
| 5 | 191.343 | D5 (variable) | | |
| 6 | 113.125 | 1.20 | 1.81600 | 46.62 |
| 7 | 13.921 | 8.22 | | |
| 8 | −28.374 | 1.10 | 1.72916 | 54.68 |
| 9 | 28.382 | 4.92 | 1.80518 | 25.46 |
| 10 | −135.911 | 0.10 | | |
| 11 (Aspheric Surface) | 144.647 | 2.65 | 1.52542 | 55.78 |
| 12 (Aspheric Surface) | −87.751 | D12 (variable) | | |
| 13 (Stop) | ∞ | D13 (variable) | | |
| 14 (Aspheric Surface) | 14.208 | 5.57 | 1.49700 | 81.54 |
| 15 (Aspheric Surface) | −42.724 | 0.10 | | |
| 16 | 18.612 | 3.77 | 1.51633 | 64.14 |
| 17 | −40.104 | 1.30 | 1.88300 | 40.76 |
| 18 | 11.879 | 4.99 | 1.49700 | 81.54 |
| 19 (Aspheric Surface) | −21.633 | D19 (variable) | | |
| 20 | −1106.045 | 1.00 | 1.80400 | 46.57 |
| 21 | 8.798 | 2.33 | 1.84666 | 23.78 |
| 22 | 12.922 | D22 (variable) | | |
| 23 (Aspheric Surface) | 33.845 | 3.91 | 1.51633 | 64.14 |
| 24 (Aspheric Surface) | −64.911 | 13.56 | | |
| 25 | ∞ | 4.00 | 1.51633 | 64.14 |
| 26 | ∞ | 0.80 | | |
| Image Plane | ∞ | | | |

Aspheric Data

11th Surface

K = 0.000, A4 = 3.49846E−05, A6 = −3.03078E−07, A8 = 3.21587E−09, A10 = −7.90949E−12

-continued

12th Surface

K = 0.000, A4 = 2.13323E−05, A6 = −2.67929E−07, A8 = 3.30300E−09,
A10 = −8.69171E−12
14th Surface K = 0.000, A4 = −2.54966E−05, A6 = 3.51889E−07,
A8 = −5.57102E−09, A10 = 4.09869E−11
15th Surface K = 0.000, A4 = 3.29900E−05, A6 = 3.99726E−07, A8 = −7.40841E−09,
A10 = 5.40404E−11
19th Surface K = 0.000, A4 = 4.76112E−05, A6 = 5.89293E−07, A8 = −6.95406E−09,
A10 = 1.44104E−10
23th Surface K = 0.000, A4 = 2.70587E−05, A6 = 2.77038E−09, A8 = 1.11660E−10,
A10 = −1.28052E−11
24th Surface K = 0.000, A4 = 1.62176E−05, A6 = −9.35316E−08, A8 = 1.26777E−09,
A10 = −1.90964E−11

Data Set 1
Zoom Data

|  | WE | ST | TE |
|---|---|---|---|
| Focal Length | 12.24 | 26.80 | 59.00 |
| Fno | 4.02 | 4.86 | 5.73 |
| Angle of View (2 ω) | 88.95 | 43.81 | 20.61 |
| Image Height | 10.82 | 10.82 | 10.82 |
| D3 | 0.80 | 15.09 | 25.4 |
| D10 | 25.6 | 11.31 | 1.00 |
| D11 | 19.74 | 9.81 | 1.01 |
| D17 | 1.80 | 4.13 | 10.26 |
| D20 | 2.42 | 10.02 | 12.69 |
| fb (in air) | 17.00 | 17.00 | 17.00 |
| Full Lens Length (in air) | 117.58 | 117.58 | 117.58 |

Data Set 2

| f 1 | 100.48 |
|---|---|
| f 2 | −17.74 |
| f 3 | 18.73 |
| f 4 | −16.37 |
| f 5 | 43.67 |

NUMERAL EXAMPLE 3

| Surface No. | r | d | nd | νd |
|---|---|---|---|---|
| 1 | 146.544 | 2.00 | 1.84666 | 23.78 |
| 2 | 76.041 | 5.46 | 1.72916 | 54.68 |
| 3 | 512.855 | 0.20 |  |  |
| 4 | 40.028 | 5.44 | 1.72916 | 54.68 |
| 5 | 97.078 | D5 (variable) |  |  |
| 6 | 94.407 | 1.00 | 1.83481 | 42.71 |
| 7 (Aspheric Surface) | 12.244 | 8.11 |  |  |
| 8 | −22.355 | 1.00 | 1.80400 | 46.57 |
| 9 | 37.360 | 0.00 |  |  |
| 10 | 37.386 | 4.32 | 1.84666 | 23.78 |
| 11 | −46.164 | 0.25 |  |  |
| 12 (Aspheric Surface) | −53.373 | 3.07 | 1.52542 | 55.78 |
| 13 (Aspheric Surface) | −30.818 | D13 (variable) |  |  |
| 14 (Stop) | ∞ | D14 (variable) |  |  |
| 15 (Aspheric Surface) | 20.113 | 4.67 | 1.49700 | 81.54 |
| 16 (Aspheric Surface) | −59.154 | 0.21 |  |  |
| 17 | 14.508 | 6.37 | 1.48749 | 70.23 |
| 18 | −34.435 | 1.00 | 1.80400 | 46.57 |
| 19 (Aspheric Surface) | 345.953 | 0.20 |  |  |
| 20 | 84.143 | 0.80 | 1.80100 | 34.97 |
| 21 | 10.618 | 4.51 | 1.49700 | 81.54 |
| 22 (Aspheric Surface) | −47.543 | D22 (variable) |  |  |
| 23 | 4726.944 | 1.00 | 1.88300 | 40.76 |
| 24 | 9.428 | 3.21 | 1.84666 | 23.78 |
| 25 | 17.732 | D25 (variable) |  |  |
| 26 (Aspheric Surface) | 28.620 | 5.30 | 1.51633 | 64.14 |
| 27 (Aspheric Surface) | −80.851 | 11.60 |  |  |
| 28 | ∞ | 4.00 | 1.51633 | 64.14 |
| 29 | ∞ | 0.80 |  |  |
| Image Plane | ∞ |  |  |  |

Aspheric Data

7th Surface

K = −0.209, A4 = 1.28579E−05, A6 = 6.33708E−08,
A8 = 9.42400E−10, A10 = −4.73717E−13
12th Surface K = 0.000, A4 = −4.46566E−06, A6 = 1.16292E−07,
A8 = −6.99502E−09, A10 = 2.78931E−11
13th Surface K = 0.000, A4 = −1.95000E−05, A6 = 3.33135E−08,
A8 = −4.19987E−09, A10 = 1.82943E−11
15th Surface K = 0.000, A4 = 2.14836E−06, A6 = 5.12283E−08,
A8 = 3.70343E−10, A10 = 1.14231E−11
16th Surface K = 0.000, A4 = 1.12620E−05, A6 = 3.57185E−08,
A8 = −1.27090E−09, A10 = 2.71225E−11
22th Surface K = 0.000, A4 = 8.85246E−05, A6 = 5.51461E−07,
A8 = −4.27979E−10, A10 = 1.16911E−11
26th Surface K = 0.000, A4 = 1.10749E−05, A6 = 2.96257E−07,
A8 = 1.27906E−09, A10 = 2.5319E−12
27th Surface K = 0.000, A4 = 1.42208E−05, A6 = 1.11588E−07,
A8 = 1.91604E−09, A10 = 1.67268E−11

Data Set 1
Zoom Data

|  | WE | ST | TE |
|---|---|---|---|
| Focal Length | 12.24 | 29.39 | 70.56 |
| Fno | 4.08 | 4.85 | 5.77 |
| Angle of View (2 ω) | 90.29 | 40.06 | 17.08 |
| Image Height | 10.82 | 10.82 | 10.82 |
| D3 | 0.20 | 14.34 | 23.11 |
| D10 | 23.11 | 8.97 | 0.20 |
| D11 | 19.83 | 10.53 | 0.20 |
| D17 | 0.99 | 3.71 | 10.55 |
| D20 | 1.91 | 8.49 | 11.98 |
| fb (in air) | 15.04 | 15.04 | 15.04 |
| Full Lens Length (in air) | 119.18 | 119.18 | 119.18 |

Data Set 2

| f 1 | 72.33 |
|---|---|
| f 2 | −16.38 |
| f 3 | 20.10 |
| f 4 | −19.34 |
| f 5 | 41.62 |

NUMERAL EXAMPLE 4

| Surface No. | r | d | nd | νd |
|---|---|---|---|---|
| 1 | 55.076 | 1.40 | 1.84666 | 23.78 |
| 2 | 35.547 | 6.68 | 1.80400 | 46.57 |
| 3 | 170.821 | D3 (variable) |  |  |

-continued

| | | | | |
|---|---|---|---|---|
| 4 | 107.113 | 1.20 | 1.88300 | 40.76 |
| 5 | 14.000 | 8.48 | | |
| 6 | −68.521 | 1.10 | 1.88300 | 40.76 |
| 7 | 20.873 | 5.80 | 1.84666 | 23.78 |
| 8 | −99.606 | 0.10 | | |
| 9 (Aspheric Surface) | 551.574 | 2.80 | 1.73310 | 48.90 |
| 10 (Aspheric Surface) | 2584.679 | D10 (variable) | | |
| 11 (Stop) | ∞ | D11 (variable) | | |
| 12 (Aspheric Surface) | 16.970 | 5.07 | 1.49700 | 81.54 |
| 13 (Aspheric Surface) | −44.281 | 0.33 | | |
| 14 | 21.450 | 3.67 | 1.51633 | 64.14 |
| 15 | −161.750 | 1.80 | 1.88300 | 40.76 |
| 16 | 11.765 | 6.30 | 1.49700 | 81.54 |
| 17 (Aspheric Surface) | −21.113 | D17 (variable) | | |
| 18 | −392.081 | 2.40 | 1.84666 | 23.78 |
| 19 | −17.145 | 1.00 | 1.76802 | 49.24 |
| 20 (Aspheric Surface) | 13.049 | D20 (variable) | | |
| 21 (Aspheric Surface) | 21.911 | 7.24 | 1.58913 | 61.25 |
| 22 (Aspheric Surface) | −16.189 | 0.10 | | |
| 23 | −22.665 | 1.60 | 1.91082 | 35.25 |
| 24 | 109.965 | 13.70 | | |
| 25 | ∞ | 4.00 | 1.51633 | 64.14 |
| 26 | ∞ | 0.80 | | |
| Image Plane | ∞ | | | |

Aspheric Data

9th Surface

K = 0.000, A4 = 5.66744E−08, A6 = −1.13783E−08, A8 = 9.08541E−10, A10 = −6.23873E−12, A12 = 1.37746E−14

10th Surface

K = 0.000, A4 = −1.26421E−05, A6 = −5.69417E−08, A8 = 1.14139E−09, A10 = −8.18677E−12, A12 = 1.66328E−14

12th Surface

K = 0.000, A4 = −2.67354E−05, A6 = 3.67269E−07, A8 = −6.65269E−09, A10 = 5.50236E−11, A12 = −1.54305E−13

13th Surface

K = 0.000, A4 = 2.06837E−05, A6 = 5.53783E−07, A8 = −9.88399E−09, A10 = 8.14377E−11, A12 = −2.27579E−13

17th Surface

K = 0.000, A4 = 1.78718E−05, A6 = −3.57782E−07, A8 = 7.19229E−09, A10 = −5.40603E−11

20th Surface

K = 0.000, A4 = −4.67726E−06, A6 = 3.78195E−07, A8 = −1.15641E−08, A10 = 7.88096E−11

21th Surface

K = 0.000, A4 = 1.83991E−06, A6 = 2.19003E−07, A8 = −3.50794E−09, A10 = 4.37525E−11, A12 = −2.07999E−13

22th Surface

K = 0.000, A4 = 3.44691E−05, A6 = 7.33532E−08, A8 = 1.00896E−09, A10 = 6.33402E−12, A12 = −8.66586E−14

Data Set 1
Zoom Data

| | WE | ST | TE |
|---|---|---|---|
| Focal Length | 12.24 | 30.00 | 81.99 |
| Fno | 4.04 | 4.98 | 5.76 |
| Angle of View (2 ω) | 88.91 | 40.54 | 14.95 |
| Image Height | 10.82 | 10.82 | 10.82 |
| D3 | 0.80 | 17.09 | 32.78 |
| D10 | 32.98 | 16.69 | 1.00 |
| D11 | 24.00 | 10.09 | 1.01 |
| D17 | 1.80 | 4.63 | 14.17 |
| D20 | 3.14 | 14.22 | 13.76 |
| fb (in air) | 17.14 | 17.14 | 17.14 |
| Full Lens Length (in air) | 136.92 | 136.92 | 136.92 |

Data Set 2

| | |
|---|---|
| f 1 | 102.23 |
| f 2 | −16.86 |
| f 3 | 20.36 |
| f 4 | −17.70 |
| f 5 | 59.74 |

NUMERAL EXAMPLE 5

| Surface No. | r | d | nd | νd |
|---|---|---|---|---|
| 1 | 55.126 | 1.40 | 1.84666 | 23.78 |
| 2 | 35.205 | 6.86 | 1.77250 | 49.62 |
| 3 | 228.211 | D3 (variable) | | |
| 4 | 136.896 | 1.20 | 1.88300 | 40.76 |
| 5 | 14.538 | 8.27 | | |
| 6 | −58.783 | 1.10 | 1.88300 | 40.76 |
| 7 | 20.768 | 5.76 | 1.84666 | 23.78 |
| 8 | −110.576 | 0.10 | | |
| 9 (Aspheric Surface) | 89.717 | 2.80 | 1.51633 | 64.14 |
| 10 (Aspheric Surface) | 223.023 | D10 (variable) | | |
| 11 (Stop) | ∞ | D11 (variable) | | |
| 12 (Aspheric Surface) | 18.085 | 4.91 | 1.49700 | 81.54 |
| 13 (Aspheric Surface) | −54.894 | 0.10 | | |
| 14 | 22.416 | 4.36 | 1.57099 | 50.80 |
| 15 | −50.776 | 0.49 | | |
| 16 | −79.214 | 1.10 | 1.88300 | 40.76 |
| 17 | 11.037 | 8.00 | 1.49700 | 81.54 |
| 18 (Aspheric Surface) | −21.647 | D18 (variable) | | |
| 19 | −254.499 | 2.12 | 1.84666 | 23.78 |
| 20 | −20.128 | 1.00 | 1.76802 | 49.24 |
| 21 (Aspheric Surface) | 12.987 | D21 (variable) | | |
| 22 (Aspheric Surface) | 20.490 | 7.80 | 1.58913 | 61.25 |
| 23 (Aspheric Surface) | −14.847 | 0.10 | | |
| 24 | −21.609 | 2.00 | 1.91082 | 35.25 |
| 25 | 85.870 | 13.76 | | |
| 26 | ∞ | 4.00 | 1.51633 | 64.14 |
| 27 | ∞ | 0.80 | | |
| Image Plane | ∞ | | | |

Aspheric Data

9th Surface

K = 0.000, A4 = −1.83811E−06, A6 = 6.23413E−08, A8 = 6.21338E−10, A10 = −7.56630E−12, A12 = 2.73135E−14

10th Surface

K = 0.000, A4 = −1.75480E−05, A6 = 1.60252E−08, A8 = 8.00977E−10, A10 = −8.44040E−12, A12 = 2.80324E−14

12th Surface

K = 0.000, A4 = −2.66818E−05, A6 = 3.79005E−07, A8 = −7.20215E−09, A10 = 5.48453E−11, A12 = −1.14768E−13

13th Surface

K = 0.000, A4 = 1.68285E−05, A6 = 5.34111E−07, A8 = −9.18940E−09, A10 = 6.93287E−11, A12 = −1.37197E−13

18th Surface

K = 0.000, A4 = 9.98745E−06, A6 = −4.82176E−07, A8 = 7.97302E−09, A10 = −7.66033E−11

21th Surface

K = 0.000, A4 = −1.23603E−05, A6 = 2.12617E−07, A8 = −1.02960E−08, A10 = 7.54788E−11

22th Surface

K = 0.000, A4 = 1.16070E−05, A6 = 1.60956E−07, A8 = −1.95449E−09, A10 = 1.93458E−11, A12 = −4.17072E−14

23th Surface

K = 0.000, A4 = 6.75676E−05, A6 = 2.36415E−07, A8 = −2.37286E−09, A10 = 3.13555E−11, A12 = −1.01627E−13

-continued

Data Set 1
Zoom Data

|  | WE | ST | TE |
|---|---|---|---|
| Focal Length | 12.24 | 28.00 | 94.00 |
| Fno | 4.04 | 5.02 | 5.80 |
| Angle of View (2 ω) | 88.91 | 43.00 | 13.04 |
| Image Height | 10.82 | 10.82 | 10.82 |
| D3 | 0.80 | 14.64 | 33.06 |
| D10 | 33.26 | 19.42 | 1.00 |
| D11 | 29.02 | 13.51 | 1.00 |
| D17 | 1.80 | 4.33 | 16.10 |
| D20 | 2.02 | 15.00 | 15.74 |
| fb (in air) | 17.19 | 17.19 | 17.19 |
| Full Lens Length (in air) | 143.56 | 143.56 | 143.56 |

Data Set 2

| f1 | 98.96 |
|---|---|
| f2 | −16.86 |
| f3 | 21.39 |
| f4 | −17.02 |
| f5 | 55.09 |

NUMERAL EXAMPLE 6

| Surface No. | r | d | nd | vd |
|---|---|---|---|---|
| 1 | 52.938 | 2.00 | 1.84666 | 23.78 |
| 2 | 35.397 | 8.74 | 1.72916 | 54.68 |
| 3 | 205.359 | D3 (variable) | | |
| 4 | 252.878 | 1.50 | 1.88300 | 40.76 |
| 5 | 20.151 | 8.11 | | |
| 6 (Aspheric Surface) | −81.470 | 1.50 | 1.69350 | 53.21 |
| 7 (Aspheric Surface) | 59.489 | 0.15 | | |
| 8 | 47.395 | 7.27 | 1.76182 | 26.52 |
| 9 | −38.211 | 0.28 | | |
| 10 | −35.347 | 1.50 | 1.77250 | 49.60 |
| 11 | 357.963 | D11 (variable) | | |
| 12 (Stop) | ∞ | D12 (variable) | | |
| 13 (Aspheric Surface) | 18.627 | 6.68 | 1.49700 | 81.54 |
| 14 (Aspheric Surface) | −30.289 | 3.95 | | |
| 15 | 57.730 | 6.11 | 1.48749 | 70.23 |
| 16 | −49.426 | 1.00 | 1.90366 | 31.32 |
| 17 | 243.572 | 2.56 | 1.49700 | 81.54 |
| 18 (Aspheric Surface) | −41.942 | D18 (variable) | | |
| 19 | 104.757 | 1.00 | 1.91082 | 35.25 |
| 20 | 9.389 | 4.63 | 1.59270 | 35.31 |
| 21 | 17.696 | D21 (variable) | | |
| 22 (Aspheric Surface) | 37.781 | 3.32 | 1.58313 | 59.38 |
| 23 (Aspheric Surface) | −190.868 | 11.10 | | |
| 24 | ∞ | 4.00 | 1.51633 | 64.14 |
| 25 | ∞ | 0.80 | | |
| Image Plane | ∞ | | | |

Aspheric Data

6th Surface

K = 0.000, A4 = 4.44432E−07, A6 = 7.90512E−09, A8 = 2.85908E−10, A10 = −9.77275E−13

7th Surface

K = 0.000, A4 = −2.62226E−06, A6 = 1.25820E−08, A8 = 1.91134E−10, A10 = −9.50203E−13

13th Surface

K = 0.000, A4 = −2.98636E−05, A6 = 6.07607E−08

14th Surface

K = 0.000, A4 = 1.57106E−05, A6 = 7.51891E−08

18th Surface

K = 0.000, A4 = 4.34138E−06, A6 = 5.23615E−08

-continued

22th Surface

K = 0.000, A4 = 7.48893E−05, A6 = −1.77938E−08, A8 = −6.79378E−10, A10 = 4 31753E−12

23th Surface

K = 0.000, A4 = 7.96726E−05, A6 = −8.31628E−08, A8 = −6.12256E−10, A10 = 3.70887E−12

Data Set 1
Zoom Data

|  | WE | ST | TE |
|---|---|---|---|
| Focal Length | 12.30 | 37.80 | 118.18 |
| Fno | 4.08 | 5.00 | 5.77 |
| Angle of View (2 ω) | 90.02 | 32.22 | 10.36 |
| Image Height | 10.82 | 10.82 | 10.82 |
| D3 | 0.80 | 22.41 | 40.18 |
| D10 | 41.22 | 19.61 | 1.84 |
| D11 | 28.08 | 12.56 | 1.00 |
| D17 | 1.81 | 3.73 | 11.47 |
| D20 | 2.50 | 16.10 | 19.92 |
| fb (in air) | 14.54 | 14.54 | 14.54 |
| Full Lens Length (in air) | 149.25 | 149.25 | 149.25 |

Data Set 2

| f1 | 105.59 |
|---|---|
| f2 | −19.29 |
| f3 | 21.25 |
| f4 | −16.44 |
| f5 | 54.38 |

NUMERAL EXAMPLE 7

| Surface No. | r | d | nd | vd |
|---|---|---|---|---|
| 1 | 40.263 | 1.29 | 1.84666 | 23.78 |
| 2 | 29.746 | 7.31 | 1.72916 | 54.68 |
| 3 | 278.129 | D3 (variable) | | |
| 4 | 139.796 | 1.00 | 1.83481 | 42.71 |
| 5 | 11.899 | 7.85 | | |
| 6 | −22.609 | 1.00 | 1.80400 | 46.57 |
| 7 | 34.548 | 4.38 | 1.74077 | 27.76 |
| 8 | −30.972 | 0.10 | | |
| 9 (Aspheric Surface) | 39.907 | 3.50 | 1.52542 | 55.78 |
| 10 (Aspheric Surface) | 145.451 | D10 (variable) | | |
| 11 (Stop) | ∞ | D11 (variable) | | |
| 12 (Aspheric Surface) | 17.180 | 5.13 | 1.49700 | 81.54 |
| 13 (Aspheric Surface) | −72.135 | 0.10 | | |
| 14 | 15.472 | 6.24 | 1.48749 | 70.23 |
| 15 | −23.128 | 1.00 | 1.80400 | 46.57 |
| 16 | 28.796 | 0.70 | | |
| 17 | 56.670 | 1.10 | 1.80100 | 34.97 |
| 18 | 15.718 | 3.73 | 1.49700 | 81.54 |
| 19 (Aspheric Surface) | −20.851 | D19 (variable) | | |
| 20 | 131.499 | 1.97 | 1.88300 | 40.76 |
| 21 | 10.251 | 2.14 | 1.84666 | 23.78 |
| 22 | 16.659 | D22 (variable) | | |
| 23 | 20.439 | 4.00 | 1.51633 | 64.14 |
| 24 | 90.202 | 13.08 | | |
| 25 | ∞ | 4.00 | 1.51633 | 64.14 |
| 26 | ∞ | 0.80 | | |
| Image Plane | ∞ | | | |

Aspheric Data

9th Surface

K = 0.000, A4 = 5.76601E−05, A6 = −9.05864E−08, A8 = 5.31964E−09, A10 = −2.59807E−11

-continued

10th Surface

K = 0.000, A4 = 3.74443E−05, A6 = −7.75028E−08, A8 = 6.59071E−09,
A10 = −3.83533E−11
12th Surface K = 0.000, A4 = 7.48908E−06, A6 = 4.86350E−07, A8 = −7.01907E−09,
A10 = 5.98610E−11
13th Surface K = 0.000, A4 = 2.45836E−05, A6 = 5.59914E−07, A8 = −1.07754E−08,
A10 = 8.59302E−11
19th Surface K = 0.000, A4 = 8.78207E−05, A6 = 1.93554E−07, A8 = 9.40918E−09,
A10 = −1.77144E−11

Data Set 1
Zoom Data

|  | WE | ST | TE |
|---|---|---|---|
| Focal Length | 14.35 | 31.00 | 68.60 |
| Fno | 3.93 | 4.81 | 5.75 |
| Angle of View (2 ω) | 79.81 | 37.66 | 17.77 |
| Image Height | 10.82 | 10.82 | 10.82 |
| D3 | 0.81 | 13.92 | 21.27 |
| D10 | 21.65 | 8.54 | 1.00 |
| D11 | 19.40 | 12.06 | 1.00 |
| D17 | 1.80 | 4.16 | 9.29 |
| D20 | 2.37 | 7.35 | 13.28 |
| fb (in air) | 16.51 | 16.51 | 16.51 |
| Full Lens Length (in air) | 115.07 | 115.07 | 115.07 |

Data Set 2

| f 1 | 67.83 |
|---|---|
| f 2 | −17.24 |
| f 3 | 21.53 |
| f 4 | −21.24 |
| f 5 | 50.20 |

FIGS. 9, 11, 13, 15, 17, 19 and 21 are sets of aberration diagrams for Examples 1 to 7 on an infinite object point (a) at the wide-angle end (WE), (b) in the intermediate setting (ST), and (c) at the telephoto end (TE), respectively, and FIGS. 10, 12, 14, 16, 18, 20 and 22 are sets of aberration diagrams for Examples 1 to 7 in a near object distance (a) at the wide-angle end (WE), (b) in the intermediate setting (ST), and (c) at the telephoto end (TE), respectively.

Figure 14:
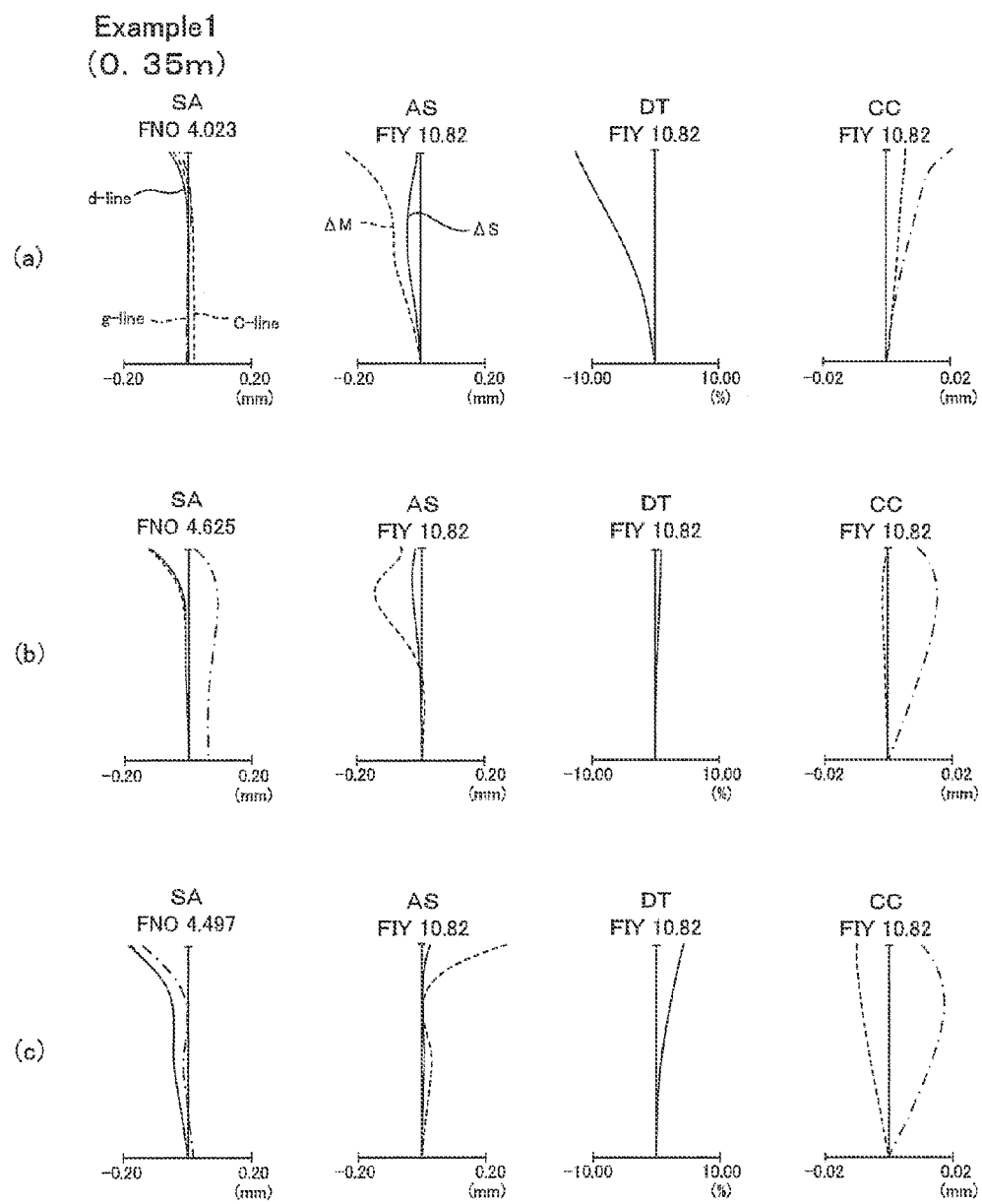
FIG. 14 is a set of aberration diagrams for the zoom lens of Example 3.
Figure 15:
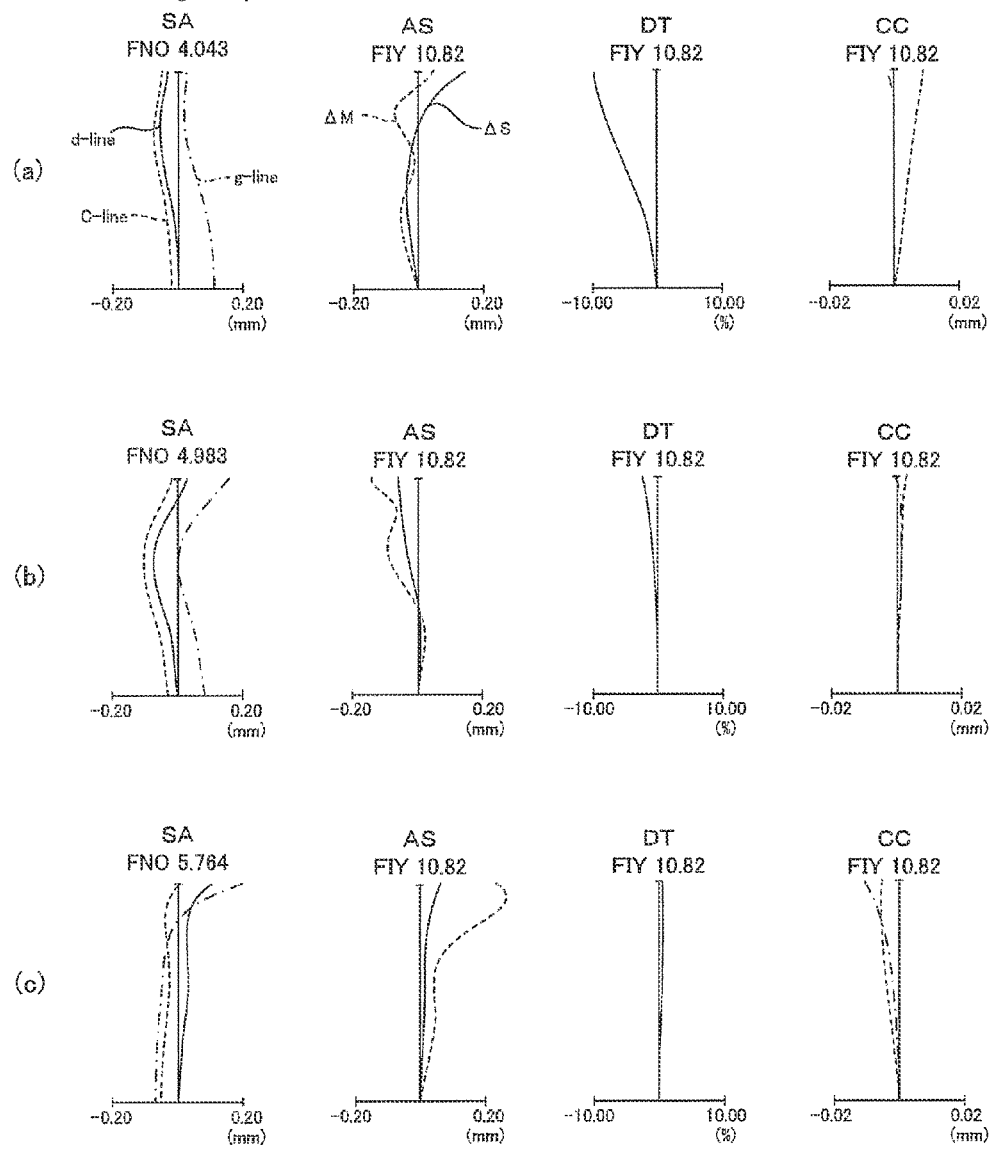
FIG. 15 is a set of aberration diagrams for the zoom lens of Example 4.
Figure 18:
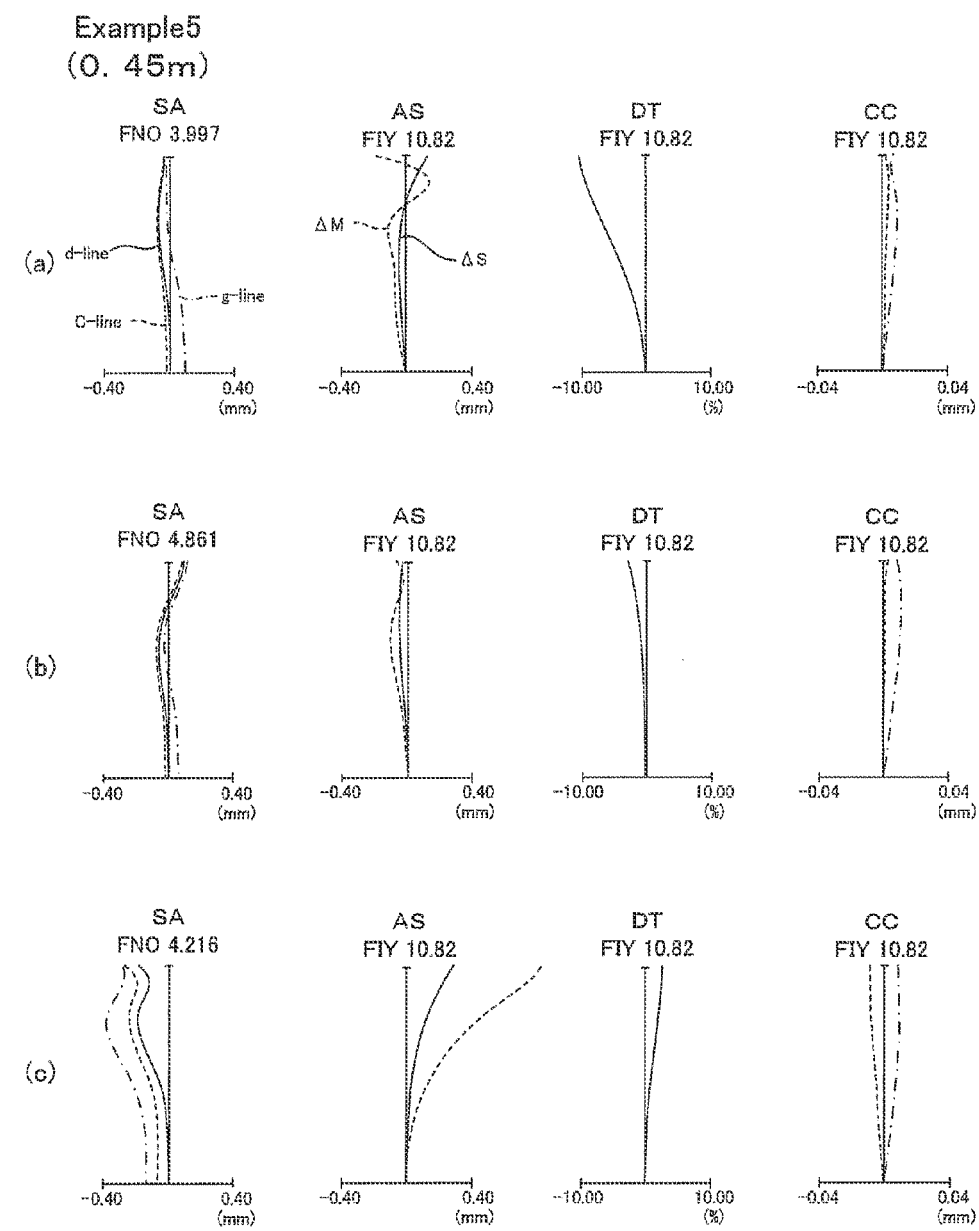
FIG. 18 is a set of aberration diagrams for the zoom lens of Example 5.
Figure 21:
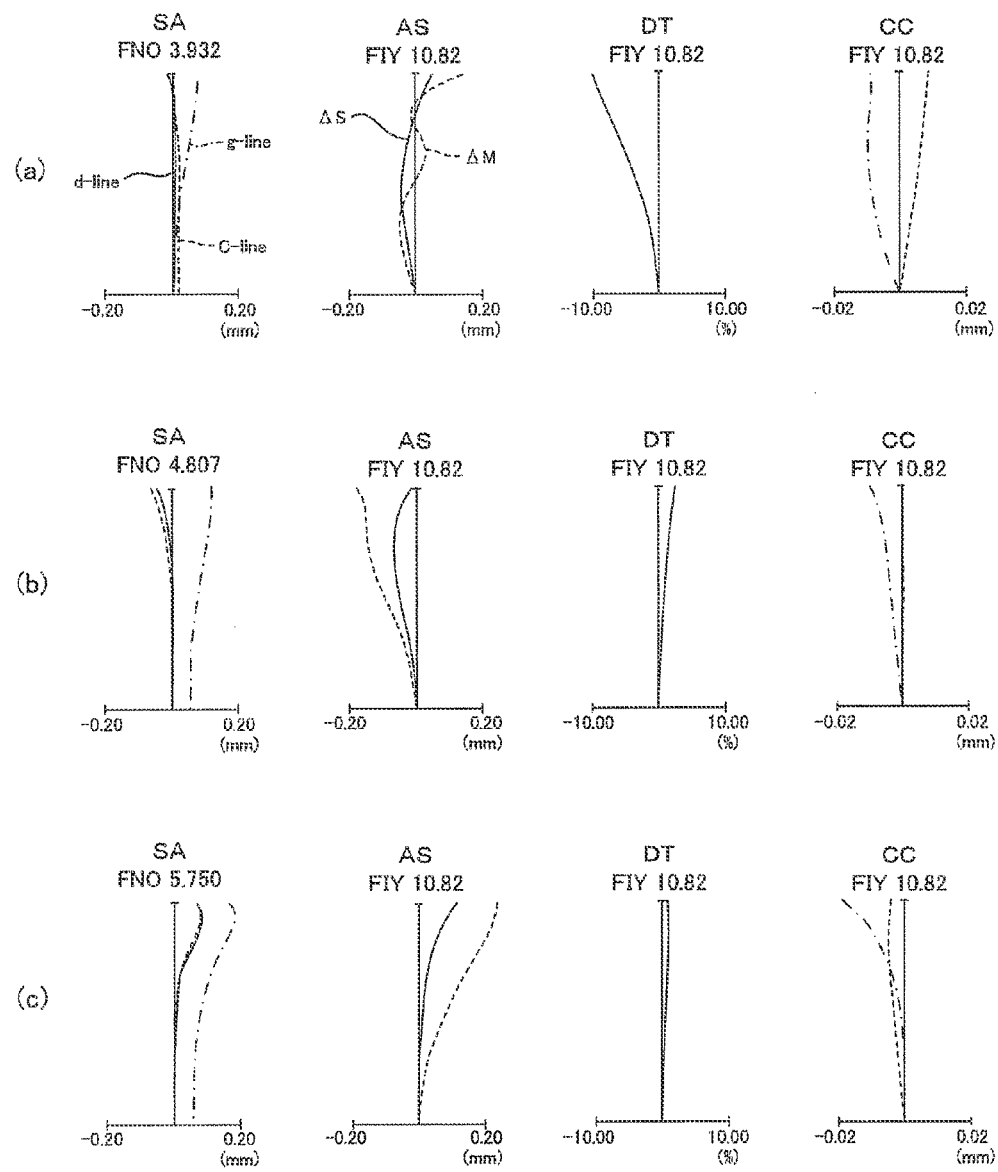
FIG. 21 is a set of aberration diagrams for the zoom lens of Example 7
Figure 22:
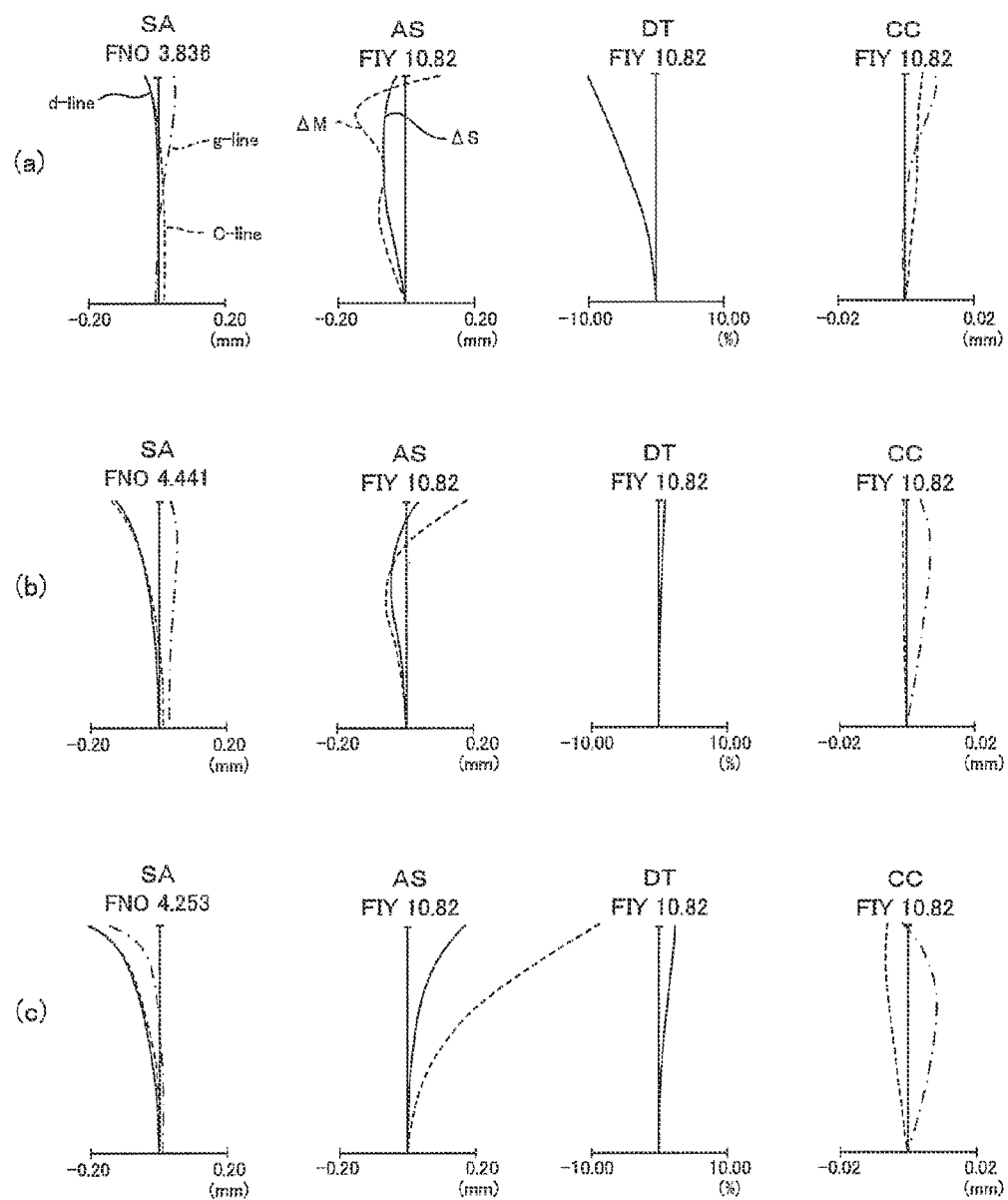
FIG. 22 is a set of aberration diagrams for the zoom lens of Example 7.

Specifically, FIGS. 10 and 12 are sets of aberration diagrams for Examples 1 and 2 in an object distance of 0.35 m. FIG. 14 is a set of aberration diagrams for Example 3 in an object distance of 0.35 m. FIG. 16 is a set of aberration diagrams for Example 4 in an object distance of 0.4 m. FIG. 18 is a set of aberration diagrams for Example 5 in an object distance of 0.45 m. FIG. 20 is a set of aberration diagrams for Example 6 in an object distance of 0.5 m. FIG. 22 is a set of aberration diagrams for Example 7 in an object distance of 0.3 m.

In those aberration diagrams, SA, AS, DT and CC stand for spherical aberrations, astigmatism, distortion and chromatic aberration of magnification, respectively. Given are spherical aberrations SA at the respective wavelengths of 587.6 mm (d-line: a solid line), 435.8 nm (g-line: a broken line) and 656.3 nm (C-line: a dotted line), and chromatic aberration of magnification CC at the respective wavelengths of 435.8 nm (g-line: a broken line) and 656.3 nm (C-line: a dotted line) on a d-line basis. Astigmatisms DT are given with the sagittal image plane as a solid line and the meridional image plane as a broken line. Note here that FNO and FIY are indicative of an F-number and the maximum image height, respectively.

Tabulated below are the values of Conditions (1A) to (7A) and (AA) in Examples 1 to 7.

| Condition | Example 1 | Example 2 | Example 3 | Example 4 |
|---|---|---|---|---|
| (1A) | −0.170 | −0.163 | −0.267 | −0.173 |
| (2A) | 0.080 | 0.094 | 0.084 | 0.096 |
| (3A) | 0.062 | 0.070 | 0.064 | 0.068 |
| (4A) | 0.418 | 0.498 | 0.737 | 0.415 |
| (5A) | 0.080 | 0.090 | 0.181 | 0.079 |
| (6A) | 9.35 | 9.30 | 9.63 | 11.07 |
| (7A) | 2.08 | 2.01 | 1.87 | 2.61 |
| (AA) | 10.82 | 10.82 | 10.82 | 10.82 |

| Condition | Example 5 | Example 6 | Example 7 |
|---|---|---|---|
| (1A) | −0.172 | −0.156 | −0.313 |
| (2A) | 0.123 | 0.237 | 0.059 |
| (3A) | 0.086 | 0.139 | 0.053 |
| (4A) | 0.430 | 0.529 | 0.482 |
| (5A) | 0.083 | 0.102 | 0.127 |
| (6A) | 11.68 | 12.45 | 9.11 |
| (7A) | 2.64 | 3.20 | 1.43 |
| (AA) | 10.82 | 10.82 | 10.82 |

Tabulated below are also the values of Conditions (1B) to (11B) in Examples 1 to 7.

| Condition | Example 1 | Example 2 | Example 3 | Example 4 |
|---|---|---|---|---|
| (1B) | 4.8 | 4.8 | 5.8 | 6.7 |
| (2B) | 9.35 | 9.30 | 9.63 | 11.07 |
| (3B) | −0.170 | −0.163 | −0.267 | −0.173 |
| (4B) | 0.418 | 0.498 | 0.737 | 0.415 |
| (5B) | 0.080 | 0.090 | 0.181 | 0.079 |
| (6B) | 2.08 | 2.01 | 1.87 | 2.61 |
| (7B) | 0.191 | 0.186 | 0.278 | 0.199 |
| (8B) | 1.040 | 1.056 | 1.227 | 1.208 |
| (9B) | 2.667 | 2.731 | 2.624 | 3.356 |
| (10B) | 1.205 | 1.197 | 1.190 | 1.169 |
| (11B) | 0.468 | 0.451 | 0.591 | 0.435 |

| Condition | Example 5 | Example 6 | Example 7 |
|---|---|---|---|
| (1B) | 7.7 | 9.6 | 4.8 |
| (2B) | 11.68 | 12.45 | 9.11 |
| (3B) | −0.172 | −0.156 | −0.313 |
| (4B) | 0.430 | 0.529 | 0.482 |
| (5B) | 0.083 | 0.102 | 0.127 |
| (6B) | 2.64 | 3.20 | 1.43 |
| (7B) | 0.261 | 0.201 | 0.317 |
| (8B) | 1.269 | 1.102 | 1.249 |
| (9B) | 3.606 | 3.228 | 2.175 |
| (10B) | 1.205 | 1.399 | 1.197 |
| (11B) | 0.407 | 0.471 | 0.706 |

Figure 23:
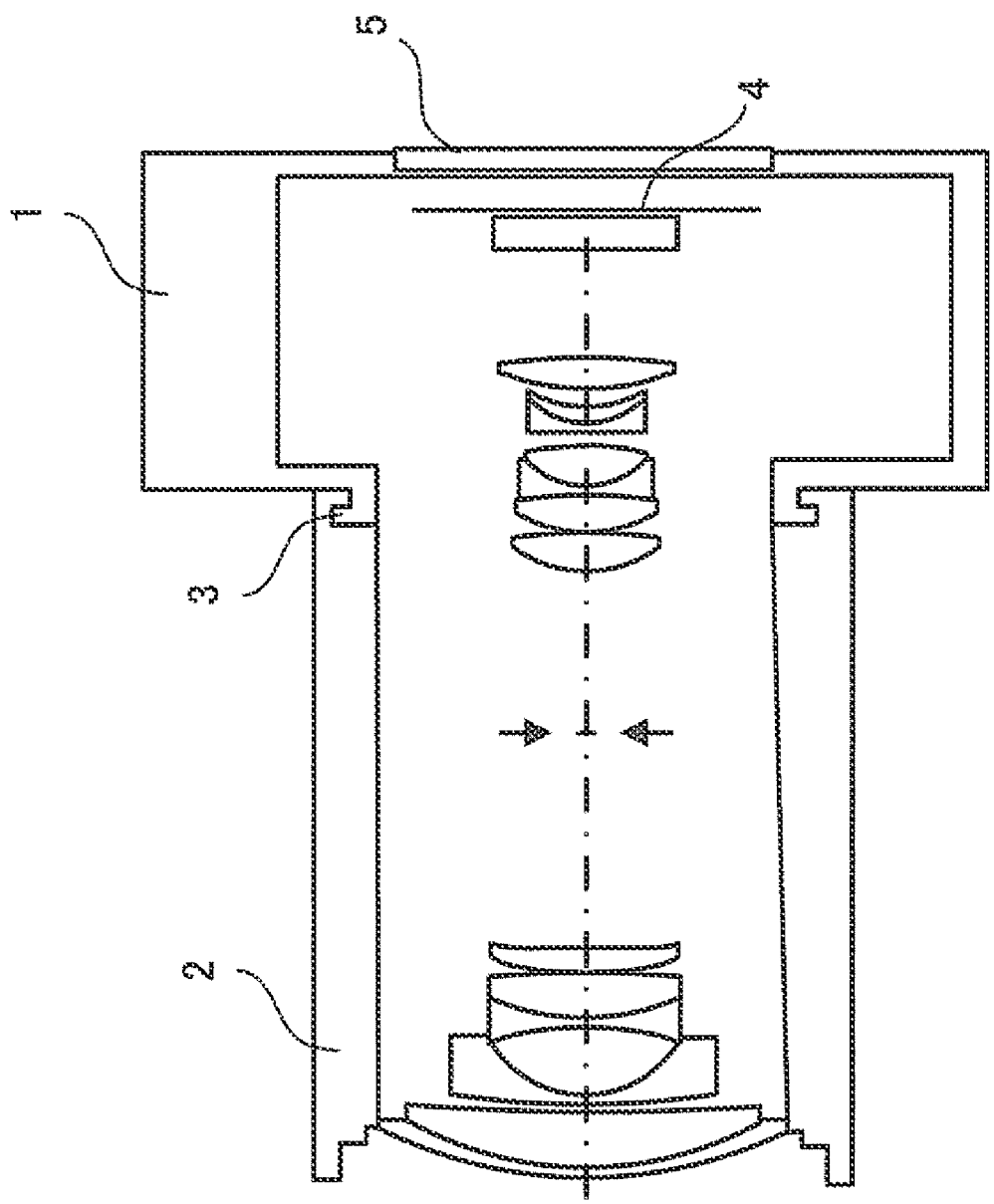
FIG. 23 is a sectional view of an imaging apparatus having the inventive zoom lens used as an interchangeable lens.

FIG. 23 is a sectional view of a single-lens mirrorless camera that is one example of the imaging apparatus that uses the zoom lens according to a specific embodiment of the invention and incorporates a small-format CCD, CMOS or the like as an imaging device. In FIG. 23, reference numeral 1 is a single-lens mirrorless camera; 2 is an imaging lens system located within a lens barrel; and 3 is a lens barrel mount for making the imaging lens system 2 attachable to or detachable from the single-lens mirrorless camera 1. For that lens mount, for instance, a screw or bayonet type mount may be used. The bayonet type mount is here used. Reference numerals 4 and 5 are an imaging device plane and a back monitor, respectively.

As the imaging lens system 2 in the thus assembled single-lens mirrorless camera 1, for instance, the zoom lenses of Examples 1 to 7 that embody the present invention may be used.

Figure 24:
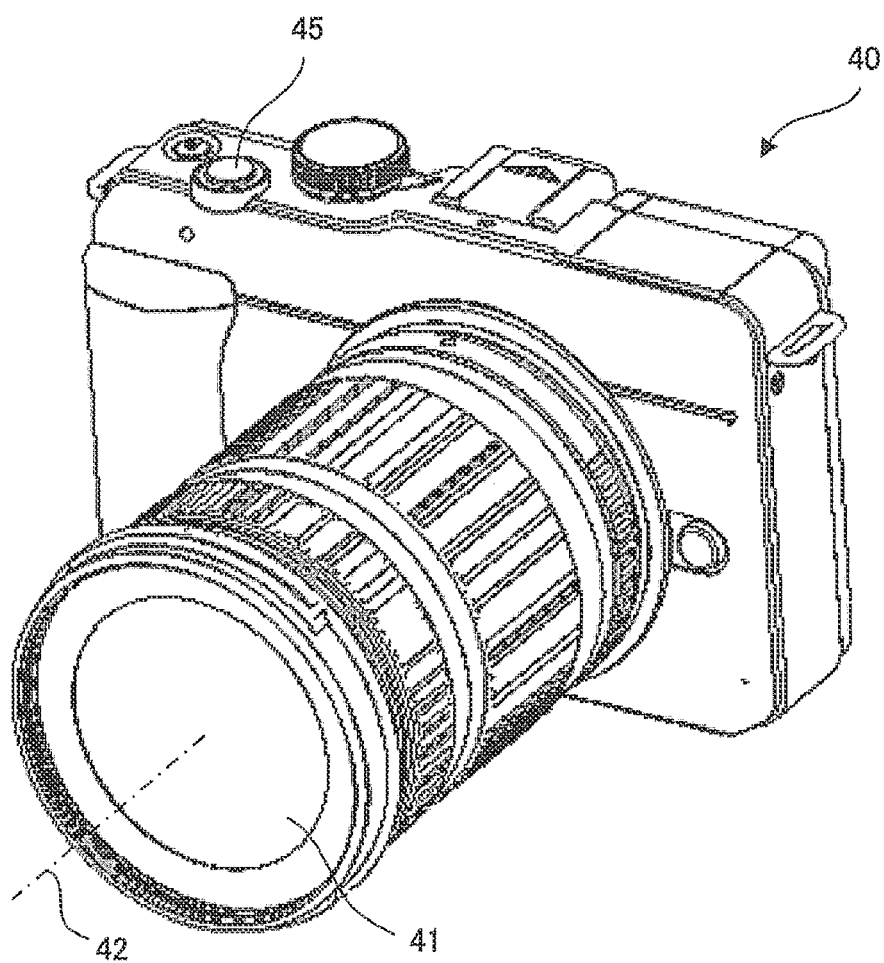
FIG. 24 is a front perspective view of the outside configuration of the inventive digital camera.
Figure 25:
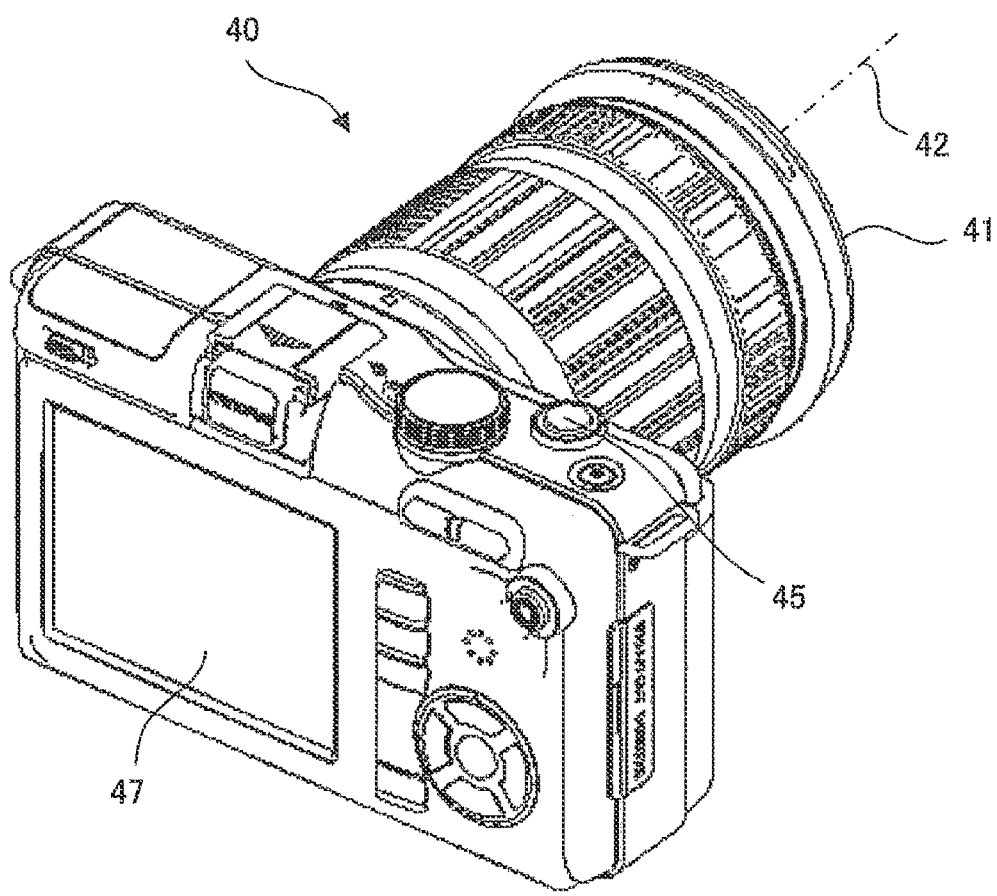
FIG. 25 is a rear perspective view of the outside configuration of the inventive digital camera.

FIGS. 24 and 25 are illustrative in conception of the inventive imaging apparatus in which the zoom lens is built in an image-taking optical system 41. More specifically, FIG. 24 is a front perspective view of the outside configuration of a digital camera 40 as the imaging apparatus, and FIG. 25 is a rear view of the same.

In this embodiment, the digital camera 40 includes an image-taking optical system 41 positioned on a taking optical path 42, a shutter button 45, a liquid crystal display monitor 47, and so on. As the shutter button 45 located on the upper portion of the camera 40 is pressed down, it causes images to be taken through the image-taking optical system 41, for instance, the zoom lens of Example 1. An object image formed through the image-taking optical system 41 is formed on the imaging device (photoelectric transformation plane) located in the vicinity of the imaging plane. The object image received on the imaging device is displayed as an electronic image on the liquid crystal display monitor 47 located on the back of the camera via processing means. The taken electronic images may be recorded in recording means.

Figure 26:
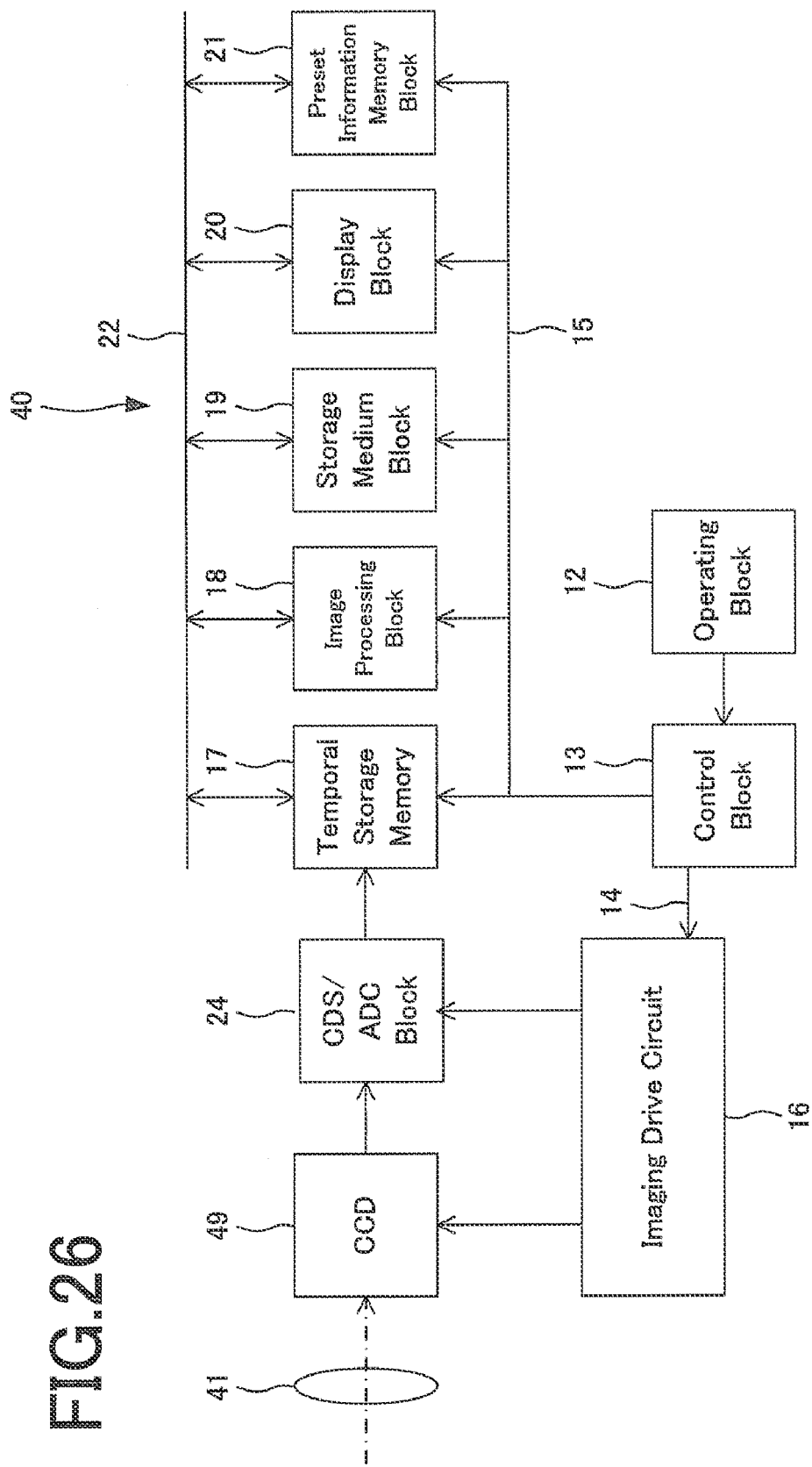
FIG. 26 is a block diagram of the control arrangement for the inventive digital camera.

FIG. 26 is a block diagram for the internal circuitry in the main part of the digital camera 40. In what follows, the aforesaid processing means shown by 51 is made up of, typically, a CDS/ADC block 24, a temporary storage memory 17, and an image processing block 18, and a storage means 52 is made up of, typically, a storage medium block.

As shown in FIG. 26, the digital camera 40 includes an operating block 12, a control block 13 connected to the operating block 12, an imaging drive circuit 16 and a temporal storage memory 17 connected to the control signal output port of the control block 13 via buses 14 and 15, an image processing block 18, a storage medium block 19, a display block 20, and a preset information storage memory block 21.

The temporal storage memory 17, image processing block 18, storage medium block 19, display block 20 and preset storage memory block 21 are designed such that data are mutually entered in or produced out of them via a bus 22, and the imaging drive circuit 16 is connected with the CCD 49 and CDS/ADC block 24.

The operating block 12 is a circuit including various input buttons and switches, through which event information entered (by a camera operator) from outside is notified to the control block. The control block 13 is a central computing unit that is made up of typically a CPU and has a built-in program memory (not shown): it is a circuit that, according to the program loaded in that program memory, receives commands entered by the camera operator via the operating block 12 to have control over the digital camera 40.

The CCD 49 is an imaging device that is driven and controlled by the imaging drive circuit 16, and converts or transforms light quantity per pixel of the object image formed through the imaging optical system 41 into electrical signals that are in turn sent out to the CDS/ADC block 24.

The CDS/ADC block 24 is a circuit that amplifies electrical signals entered from CCD 49 and subjects them to analog-to-digital conversion so that image raw data (Bayer data: hereinafter called the RAW data) subjected only to amplification and digital conversion are sent out to the temporal memory 17.

The temporal storage memory 17 is a buffer made up of typically an SDRAM: it is a memory device for temporal storage of the RAW data produced out of the CDS/ADC block 24. The image processing block 18 is a circuit that reads out the RAW data stored in the temporal storage memory 17 or the RAW data stored in the storage medium block 19 thereby electrically implementing various forms of processing including distortion correction, based on an image quality parameter instructed by the control block 13.

The storage medium block 19 detachably receives a card type or stick type recording medium comprising typically a flash memory so that the RAW data transferred from the temporal memory 17 or image data processed at the image processing block 18 are recorded and held in that flash memory.

The display block 20 includes the liquid crystal display monitor 47 to display the taken RAW data or image data, operating menus or the like on it. The preset information storage memory block 21 includes a ROM sub-block having various image quality parameters previously loaded in it, and a RAM sub-block for storing an image quality parameter read out of that ROM sub-block by entering operation of the operating block 12.

The thus assembled digital camera 40, because the inventive zoom lens is used as the imaging optical system 41, may be used as a small-format imaging apparatus suitable well fit for the taking of moving images.

While various embodiments of the invention have been explained, it is to be understood that the present invention is never limited thereto, and embodiments comprising combinations of the essential requirements and limitations are embraced in the category of the invention too.

What is claimed is:

1. A zoom lens, which comprises, in order from an object side to an image side thereof,
   a first lens group of positive refracting power,
   a second lens group of negative refracting power,
   an aperture stop,
   a third lens group of positive refracting power,
   a fourth lens group of negative refracting power,
   and a fifth lens group of positive refracting power, wherein:
   upon zooming from a wide-angle end to a telephoto end of the zoom lens,
   at least the first lens group and the aperture stop remain fixed in position,
   the second lens group and the third lens group move in an optical axis direction, and
   a separation between each of the lens groups and the aperture stop changes, and
   upon focusing from a focusing-on-infinity state to a close-range-focusing state,
   the fourth lens group moves in the optical axis direction, with satisfaction of the following Condition (1A):

$$-0.36 < f4/f1 < -0.05 \quad (1A)$$

where f1 is a focal length of the first lens group, and
f4 is a focal length of the fourth lens group.

2. The zoom lens according to claim 1, wherein:
   upon zooming from the wide-angle end to the telephoto end, at least the first lens group, the aperture stop and the fifth lens group remain fixed in position, and
   the second lens group, the third lens group and the fourth lens group move in the optical axis direction.

3. The zoom lens according to claim 1,
   which satisfies the following Conditions (2A) and (3A) at the wide-angle end and in the focusing-on-infinity state:

$$|y1'-y1|/\Delta s < 0.35 \quad (2A)$$

$$|y0.7'-y0.7|/\Delta s < 0.35 \quad (3A)$$

where y1 is a maximum image height on an imaging plane,
y0.7 is seven-tenth of the maximum image height, y1' is a ray height at a position where, when there is a defocus quantity of Δs from a time of focusing on infinity as the fourth lens group is moved to an object at infinity, a chief ray having the same angle of view as an image-taking angle of view reaching the image height y1 upon focusing on infinity intersects the imaging plane, y0.7' is a ray height at a position where, when there is a defocus quantity of Δs from a time of focusing on infinity as the fourth lens group is moved to an object at infinity, a chief ray having the same angle of view as an image-taking angle of view reaching the image height y0.7 upon focusing on infinity intersects the imaging plane, and Δs is 8 the maximum image height y1/1000, provided that y1, y0.7, y1', y0.7' and Δs are all given in mm.

4. The zoom lens according to claim 3, wherein the maximum image height y1 at the imaging plane satisfies the following Condition (A):

$$8.0 < y1 < 25.0 \tag{A}$$

5. The zoom lens according to claim 1, wherein: the fourth lens group wobbles in the optical axis direction prior to the focusing.

6. The zoom lens according to claim 1, wherein: the fourth lens group comprises one positive lens and one negative lens, and includes two lenses at most.

7. The zoom lens according to claim 1, which satisfies the following Condition (4A):

$$0.20 < \Sigma 1G/\Sigma 2G < 1.00 \tag{4A}$$

where Σ1G is an on-axis thickness of the first lens group, and Σ2G is an on-axis thickness of the second lens group.

8. The zoom lens according to claim 1, which satisfies the following Condition (5A):

$$0.03 < \Sigma 1G/f1 < 0.23 \tag{5A}$$

where Σ1G is an on-axis thickness of the first lens group, and f1 is a focal length of the first lens group.

9. The zoom lens according to claim 1, which satisfies the following Condition (6A):

$$\Sigma 1G5G/y1 < 15.9 \tag{6A}$$

where Σ1G5G is an on-axis thickness of an optical system from an objet-side surface in the first lens group to an image-side surface in the fifth lens group at the wide-angle end, and y1 is a maximum image height on the imaging plane.

10. The zoom lens according to claim 1, which satisfies the following Condition (7A):

$$0.50 < d2G/fw < 5.00 \tag{7A}$$

where d2G is an amount of movement of the second lens group upon zooming from the wide-angle end to the telephoto end, provided that its movement toward the image side is taken as having a positive sign, and fw is a focal length of the whole zoom lens system at the wide-angle end.

11. The zoom lens according to claim 1, wherein: the second lens group comprises four lenses: in order from the object side to the image side, a first negative lens, a second negative lens, a first positive lens and a second positive lens, and includes four lenses at most or, alternatively, the second lens group comprises four lenses: in order from the object side to the image side, a first negative lens, a second negative lens, a first positive lens and a third negative lens, and includes four lenses at most.

12. The zoom lens according to claim 1, wherein: the third lens group comprises four lenses: in order from the object side to the image side, a first positive lens, a second positive lens, a first negative lens and a third positive lens, and includes four lenses at most or, alternatively, the third lens group comprises five lenses: in order from the object side to the image side, a first positive lens, a second positive lens, a first negative lens, a second negative lens and a third positive lens, and includes five lenses at most, with at least two lenses in the third lens group being cemented together.

13. The zoom lens according to claim 1, wherein: the fifth lens group comprises one positive lens, and includes one lens at most or, alternatively, the fifth lens group comprises two lenses: one positive lens and one negative lens, and includes two lenses at most.

14. The zoom lens according to claim 1, wherein: at the telephoto end with respect to the wide-angle end, the second lens group is positioned on the image side, the third lens group is positioned on the object side, the fourth lens group is positioned on the object side, a separation between the third lens group and the fourth lens group grows wide, and a separation between the fourth lens group and the fifth lens group grows wide.

15. The zoom lens according to claim 1, which satisfies the following Conditions (8A) and (9A):

$$4.6 < ft/fw < 12.5 \tag{8A}$$

$$35° < \omega w < 50° \tag{9A}$$

where fw is a focal length of the whole zoom lens system upon focusing on infinity at the wide-angle end, ft is a focal length of the whole zoom lens system upon focusing on infinity at the telephoto end, and ωw is a maximum half angle of view upon focusing on infinity at the wide-angle end.

16. An imaging apparatus, comprising: a zoom lens as recited in claim 1, and an imaging device having an imaging plane for transforming an optical image formed by the zoom lens into electrical signals.

17. A zoom lens located on an imaging plane side of an imaging device, comprising in order from an object side to an image side thereof, a first lens group of positive refracting power,
a second lens group of negative refracting power,
an aperture stop,
a third lens group of positive refracting power,
a fourth lens group of negative refracting power, and
a fifth lens group of positive refracting power;
    upon zooming from a wide-angle end to a telephoto end of the zoom lens,
at least the first lens group and the aperture stop remain fixed in position,
the second lens group and the third lens group move in such a way as to draw nearer to the aperture stop at the telephoto end than at the wide-angle end, and
a separation of each of the lens groups and the aperture stop changes; and
upon focusing from a focusing-on-infinity state to a close-range-focusing state,
the fourth lens group moves in an optical axis direction, with satisfaction of the following Conditions (1B) and (2B):

$$4.0 < ft/fw \tag{1B}$$

$$\Sigma 1G5G/yw < 15.9 \tag{2B}$$

where fw is a focal length of the whole zoom lens system upon focusing on infinity at the wide-angle end,
ft is a focal length of the whole zoom lens system upon focusing on infinity at the telephoto end,
Σ1G5G is an on-axis thickness of an optical system from an object-side surface in the first lens group to an image-side surface in the fifth lens group at the wide-angle end, and
yw is a maximum image height on the imaging plane at the wide-angle end.

18. The zoom lens according to claim 17, wherein:
upon zooming from the wide-angle end to the telephoto end, at least the first lens group, the aperture stop and the fifth lens group remain fixed in position, and the second lens group, the third lens group and the fourth lens group move in the optical axis direction.

19. The zoom lens according to claim 17, which satisfies the following Condition (3B):

$$-0.36 < f4/f1 < -0.05 \quad (3B)$$

where f1 is a focal length of the first lens group, and
f4 is a focal length of the fourth lens group.

20. The zoom lens according to claim 17, wherein:
the fourth lens group comprises one positive lens and one negative lens, and includes two lenses at most.

21. The zoom lens according to claim 17, which satisfies the following Condition (4B):

$$0.20 < \Sigma 1G/\Sigma 2G < 1.00 \quad (4B)$$

where Σ1G is an on-axis thickness of the first lens group, and
Σ2G is an on-axis thickness of the second lens group.

22. The zoom lens according to claim 17, which satisfies the following Condition (5B):

$$0.03 < \Sigma 1G/f1 < 0.23 \quad (5B)$$

where Σ1G is an on-axis thickness of the first lens group, and
f1 is a focal length of the first lens group.

23. The zoom lens according to claim 17, which satisfies the following Condition (6B):

$$0.50 < d2G/fw < 5.00 \quad (6B)$$

where d2G is an amount of movement of the second lens group upon zooming from the wide-angle end to the telephoto end, provided that its movement toward the image side is taken as having a positive sign, and
fw is a focal length of the whole zoom lens system at the wide-angle end.

24. The zoom lens according to claim 17, wherein:
the first lens group comprises two lenses: a positive lens and a negative lens, and includes two lenses at most.

25. The zoom lens according to claim 17, wherein:
the second lens group comprises four lenses: in order from the object side to the image side, a first negative lens, a second negative lens, a first positive lens and a second positive lens, and includes four lenses at most or, alternatively,
the second lens group comprises four lenses: in order from the object side to the image side, a first negative lens, a second negative lens, a first positive lens and a third negative lens, and includes four lenses at most.

26. The zoom lens according to claim 17, wherein:
the third lens group comprises four lenses: in order from the object side to the image side, a first positive lens, a second positive lens, a first negative lens and a third positive lens, and includes four lenses at most or, alternatively,
the third lens group comprises five lenses: in order from the object side to the image side, a first positive lens, a second positive lens, a first negative lens, a second negative lens and a third positive lens, and includes five lenses at most, with at least two lenses in the third lens group being cemented together.

27. The zoom lens according to claim 17, wherein:
the fifth lens group comprises one positive lens, and includes one lens at most or, alternatively,
the fifth lens group comprises two lenses: one positive lens and one negative lens, and includes two lenses at most.

28. The zoom lens according to claim 17, wherein:
at the telephoto end with respect to the wide-angle end,
the second lens group is positioned on the image side,
the third lens group is positioned on the object side,
the fourth lens group is positioned on the object side,
a separation between the third lens group and the fourth lens group grows wide, and
a separation between the fourth lens group and the fifth lens group grows wide.

29. The zoom lens according to claim 17, which satisfies the following Conditions (7B) and (8B):

$$0.1 < f3/f1 < 0.4 \quad (7B)$$

$$0.7 < |f3/f2| < 1.9 \quad (8B)$$

where f1 is a focal length of the first lens group,
f2 is a focal length of the second lens group, and
f3 is a focal length of the third lens group.

30. The zoom lens according to claim 17, wherein:
the second lens group, the third lens group and the fourth lens group move with satisfaction of the following Conditions (9B), (10B) and (11B):

$$2.0 < \beta 3T/\beta 3W < 5.0 \quad (9B)$$

$$1.1 < \beta 4T/\beta 4W < 2.0 \quad (10B)$$

$$0.3 < (\beta 2T/\beta 2W)/\{(\beta 3T/\beta 3W)(\beta 4T/\beta 4W)\} < 0.75 \quad (11B)$$

where β2T is a transverse magnification of the second lens group at the telephoto end,
β2W is a transverse magnification of the second lens group at the wide-angle end,
β3T is a transverse magnification of the third lens group at the telephoto end,
β3W is a transverse magnification of the third lens group at the wide-angle end,
β4T is a transverse magnification of the fourth lens group at the telephoto end, and
β4W is a transverse magnification of the fourth lens group at the wide-angle end.

31. The zoom lens according to claim 17, which satisfies the following Condition (12B):

$$35° < \omega w < 50° \quad (12B)$$

where ωw is a maximum half angle of view upon focusing on infinity at the wide-angle end.

32. An imaging apparatus, comprising:
a zoom lens as recited in claim 17, and
an imaging device having an imaging plane for transforming an optical image formed by the zoom lens into electrical signals.

* * * * *